United States Patent
Nakayama

(10) Patent No.: US 9,208,387 B2
(45) Date of Patent: Dec. 8, 2015

(54) IMAGE PROCESSING DEVICE AND IMAGE PROCESSING METHOD TO ESTIMATE MOVEMENT OF A MOVABLE BODY

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 14/053,920

(22) Filed: Oct. 15, 2013

(65) Prior Publication Data

US 2014/0112543 A1   Apr. 24, 2014

(30) Foreign Application Priority Data

Oct. 18, 2012   (JP) .................................. 2012-230850

(51) Int. Cl.
*G06K 9/00* (2006.01)
*G06T 5/00* (2006.01)
*G06T 7/20* (2006.01)

(52) U.S. Cl.
CPC ............ *G06K 9/00791* (2013.01); *G06T 5/008* (2013.01); *G06T 7/2033* (2013.01); *G06T 2207/10016* (2013.01); *G06T 2207/30261* (2013.01)

(58) Field of Classification Search
None
See application file for complete search history.

(56) References Cited

U.S. PATENT DOCUMENTS

| 5,592,567 A | 1/1997 | Kilger |
| 5,910,817 A * | 6/1999 | Ohashi et al. ................. 348/159 |
| 2011/0274175 A1* | 11/2011 | Sumitomo ............... 375/240.16 |
| 2012/0008021 A1 | 1/2012 | Zhang et al. .................. 348/251 |
| 2012/0106797 A1* | 5/2012 | Wang ............................ 382/103 |

FOREIGN PATENT DOCUMENTS

| EP | 2 372 310 A2 | 10/2011 |
| JP | 8-503316 | 4/1996 |
| JP | 2003-178309 | 6/2003 |
| JP | 2010-073036 | 4/2010 |
| WO | 2010-079685 | 7/2010 |

OTHER PUBLICATIONS

Shuhei Takimoto and Takaaki Ito, "Development of 3D Scene Analysis System Using In-vehicle Camera", Sei Technical Review, No. 169, pp. 82-87, Jul. 2006.

(Continued)

*Primary Examiner* — Siamak Harandi
(74) *Attorney, Agent, or Firm* — Staas & Halsey LLP

(57) ABSTRACT

An image processing device, including a memory and a processor coupled to the memory, the processor configured to extract an edge where positions overlap with each other by comparing a first edge image extracted from an image captured for a first time and a second edge image extracted from an image captured for a second time after the first time, the image for the first time and the image for the second first time being captured from a movable body, remove the extracted edge from at least one of the first edge image and the second edge image, perform matching processing on the first and second edge images in both or one of which the extracted edge has been removed, estimate a movement amount of the movable body, by using a displacement amount between the first edge image and the second edge image which are subjected to the matching processing, and generate a projected image.

12 Claims, 21 Drawing Sheets

(56) References Cited

OTHER PUBLICATIONS

Gary Bradski and Adrian Kaehler, "Learning OpenCV", O'Reilly Media Inc., pp. 148-149, Sep. 2008.
Wenshuo Gao et al., "An Improved Sobel Edge Detection", IEEE, pp. 67-71, 2010.
"Moving Object Tracking—An Edge Segment-based Approach", International Journal of Innovative Computing, Information and Control, vol. 7, No. 7, pp. 3963-3979, XP055214593, Jul. 1, 2011.
"Caroline: An Autonomously Driving Vehicle for Urban Environments", Journal of Field Robotics, vol. 25, No. 9, pp. 672-724, XP055049523, Aug. 25, 2008.
"Lane detection and tracking using a new lane model and distance transform", Machine Vision and Applications, Springer, vol, 22, No. 4, pp. 721-737, XP019916774, Jan. 19, 2011.
Extended European Search Report of European Patent Application No. 13188258.1 dated Sep. 30, 2015.

* cited by examiner

IMAGE PROCESSING DEVICE AND IMAGE PROCESSING METHOD TO ESTIMATE MOVEMENT OF A MOVABLE BODY

CROSS-REFERENCE TO RELATED APPLICATION

This application is based upon and claims the benefit of priority of the prior Japanese Patent Application No. 2012-230850, filed on Oct. 18, 2012, the entire contents of which are incorporated herein by reference.

FIELD

The embodiments discussed herein are related to an image processing device, a movable body, and an image processing method.

BACKGROUND

Conventionally, there is a method wherein a camera is attached to a movable body, such as a vehicle, surrounding images including a road surface are captured, and the movement amount of the vehicle serving as the movable body is measured from the movement amount of a pattern on the road surface. Such a technique has been disclosed in Shuhei Takimoto and Takaaki Ito, "Development of 3D Scene Analysis System Using In-vehicle Camera", SEI TECHNICAL REVIEW, No. 169, P. 82-P. 87, July 2006.

SUMMARY

According to an aspect of the invention, an image processing device, includes: a memory; and a processor coupled to the memory, configured to: extract an edge where positions overlap with each other, by comparing a first edge image extracted from an image captured for a first time and a second edge image extracted from an image captured for a second time after the first time, the image for the first time and the image for the second first time being captured from a movable body, remove the extracted edge from at least one of the first edge image and the second edge image, perform matching processing on the first and second edge images in both or one of which the extracted edge has been removed, and estimate a movement amount of the movable body, by using a displacement amount between the first edge image and the second edge image which are subjected to the matching processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, individual embodiments will be described on the basis of accompanying drawings.

While inventing the present embodiments, observations were made regarding a related art. Such observations include the following, for example.

In the related art, a road surface image captured by a camera is converted into a top view that is viewed from above, and the movement amount of the vehicle is obtained using the movement amount of a road surface pattern in the top view between two times. The top view is an image projected onto the road surface, and also called a road surface projection image.

Figure 1:
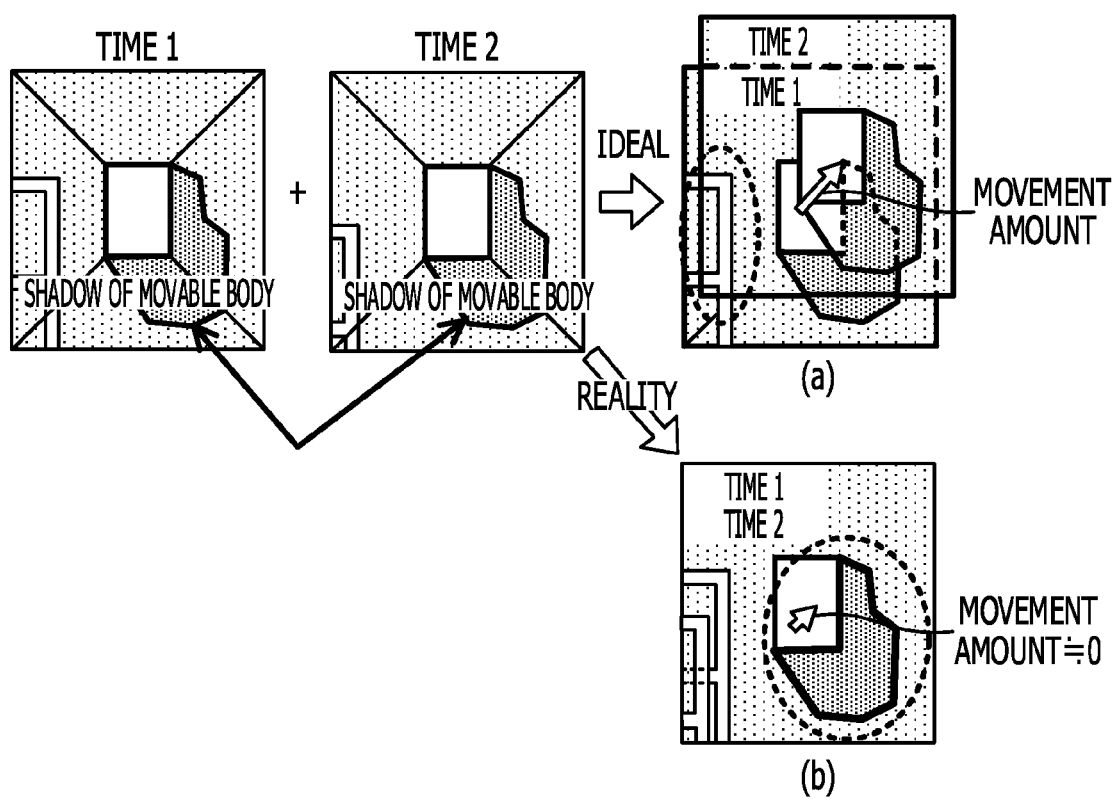
FIG. 1 is a diagram explaining image processing which relates to the present embodiments.

FIG. 1 is a diagram explaining image processing which relates to the present embodiments. When the example illustrated in FIG. 1 is used, matching processing between the image of the top view for a time 1 and the image of the top view for a time 2 is performed first. Next, the movement amount of the movable body is estimated from the displacement amount of an image where patterns coincide with each other most.

At this point, a situation will be considered where the shadow of the movable body is reflected on the road surface owing to illumination light (for example, sunlight). Ideally, as illustrated in (a) of FIG. 1, it is desirable that the movement amount is only estimated owing to the pattern of the road surface without being influenced by the shadow of the movable body.

However, when the method of the related art is used, actually when a time difference between the time 1 and the time 2 is small, matching is achieved in the shadow portion of the movable body and an erroneous displacement amount is estimated, as illustrated in (b) of FIG. 1.

The reason why the erroneous estimation occurs is that since the shape of the shadow of the movable body is almost unchanged and the relative position of the shadow is almost unchanged with respect to the movable body, the coincidence of the shape of the shadow of the movable body becomes higher than the coincidence of the pattern of the road surface.

Accordingly, in the method of the related art, when the movement amount of the movable body has been estimated using an image captured by an image capturing unit mounted in the movable body, it has been difficult to adequately estimate the movement amount, owing to the influence of the shadow of the movable body.

Therefore, the embodiments disclosed herein, for example, provide techniques for adequately estimating the movement amount of a movable body when the movement amount of the movable body is estimated using an image captured by an image capturing unit mounted in the movable body.

First Embodiment

First, the configuration of an image processing system 1 in a first embodiment will be described. The image processing system 1 is, for example, an in-vehicle system that includes a camera mounted in a vehicle that is a movable body, and a processor mounted in the vehicle. The movable body may be represented as a moving body, a moving object, a moving machine or the like.

<Configuration>

Figure 2:
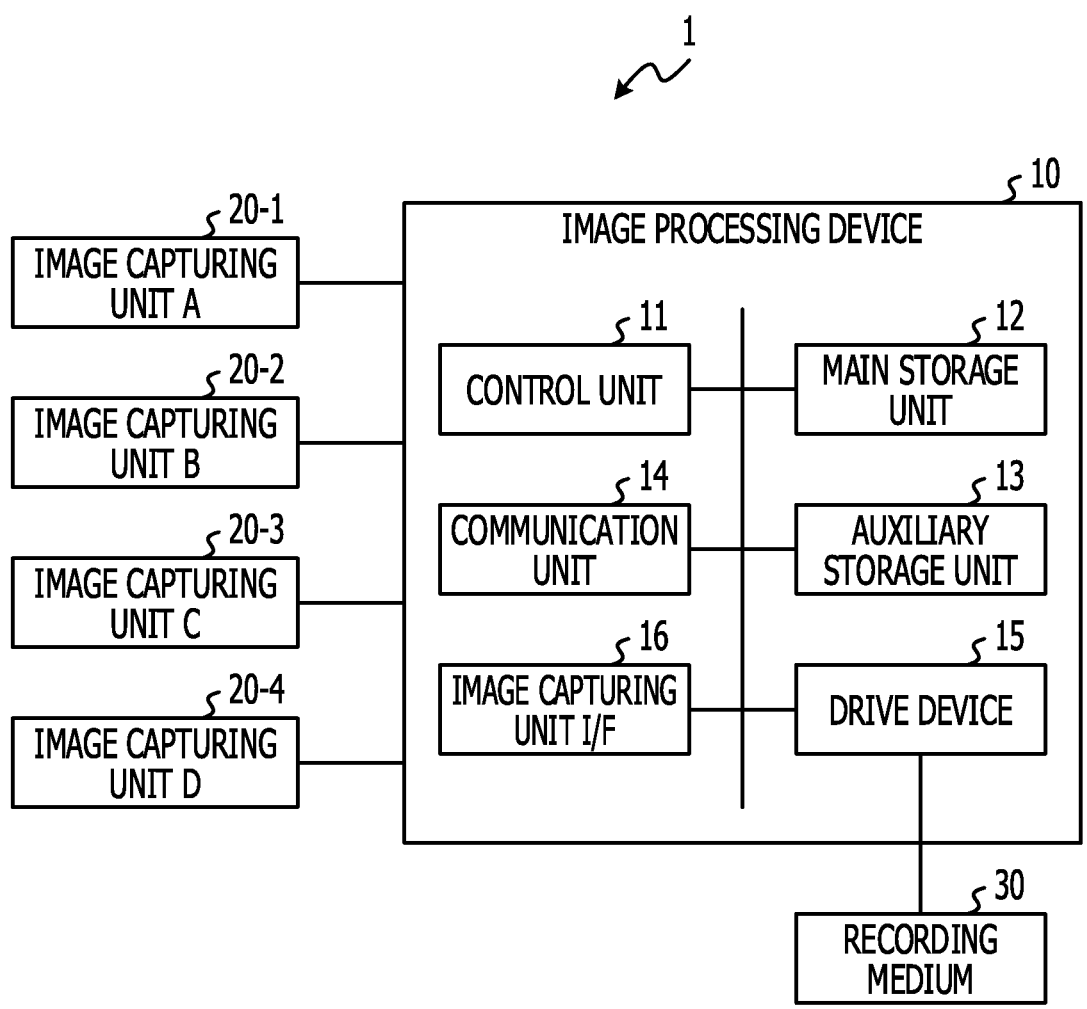
FIG. 2 is a block diagram illustrating an example of the configuration of an image processing system in a first embodiment.

FIG. 2 is a block diagram illustrating an example of the configuration of the image processing system 1 in the first embodiment. The image processing system 1 illustrated in FIG. 2 includes an image processing device 10 and an image capturing unit 20. The image capturing unit 20 includes an image capturing unit A 20-1, an image capturing unit B 20-2, an image capturing unit C 20-3, and an image capturing unit D 20-4. Hereinafter, when the individual image capturing units are not differentiated from one another, the individual image capturing units are also collectively referred to as the image capturing units 20. The image capturing unit A 20-1 is, for example, a front camera, the image capturing unit B 20-2 is, for example, a rear camera, the image capturing unit C 20-3 is, for example, a right camera, and the image capturing unit D 20-4 is, for example, a left camera.

The image capturing units 20 capture the images of surroundings that include a lower surface (for example, a road surface) located below the movable body, and output captured images to the image processing device 10. The number of the image capturing units 20 is not limited to four, and may be at least one.

The image processing device 10 uses the captured images acquired from the image capturing units 20 to estimate the movement amount of the movable body. At this point, the image processing device 10 estimates the shadow portion of the movable body existing within the captured image and appropriately estimates a movement amount by removing the influence of the shadow portion.

In addition, the image processing device 10 includes a control unit 11, a main storage unit 12, an auxiliary storage unit 13, a communication unit 14, a drive device 15, and an image capturing unit interface (I/F) 16, which are connected to one another through a data bus so as to be capable of communicating data.

Within a computer, the control unit 11 is a central processing unit (CPU) controlling each device and operating on and processing data. In addition, the control unit 11 is an arithmetic device executing programs stored in the main storage unit 12 and the auxiliary storage unit 13, and outputting data to an output device or a storage device after having received data from an input device or a storage device and performed an operation or process thereon.

The main storage unit 12 is, for example, a read-only memory (ROM) or a random access memory (RAM). The main storage unit 12 is a storage device storing or temporarily saving therein an OS serving as basic software to be executed by the control unit 11, a program such as application software, and data.

The auxiliary storage unit 13 is, for example, a hard disk drive (HDD) or the like, and is a storage device storing therein data relating to application software. The auxiliary storage unit 13 stores therein, for example, an image acquired from the capturing unit 20.

The communication unit 14 performs data communication with a peripheral device by using a wired or wireless connection. The communication unit 14 acquires an image through, for example, a network and stores the image in the auxiliary storage unit 13.

The drive device 15 may also read an image processing program, which is described below, from a recording medium 30, for example, a floppy disk or a compact disc (CD), and install the image processing program into a storage device.

In addition, the image processing program is stored in the recording medium 30, and the program stored in the recording medium 30 is mounted into the image processing device 10 by means of the drive device 15. The mounted image processing program becomes executable by the image processing device 10.

The image capturing unit I/F 16 is an interface to the image capturing unit 20, transmits a control signal to the image capturing unit 20, and acquires an image captured by the image capturing unit 20.

In addition, while not being illustrated, a display unit displaying a captured image or a processed image may be provided in the image processing system 1.

<Function>

Figure 3:
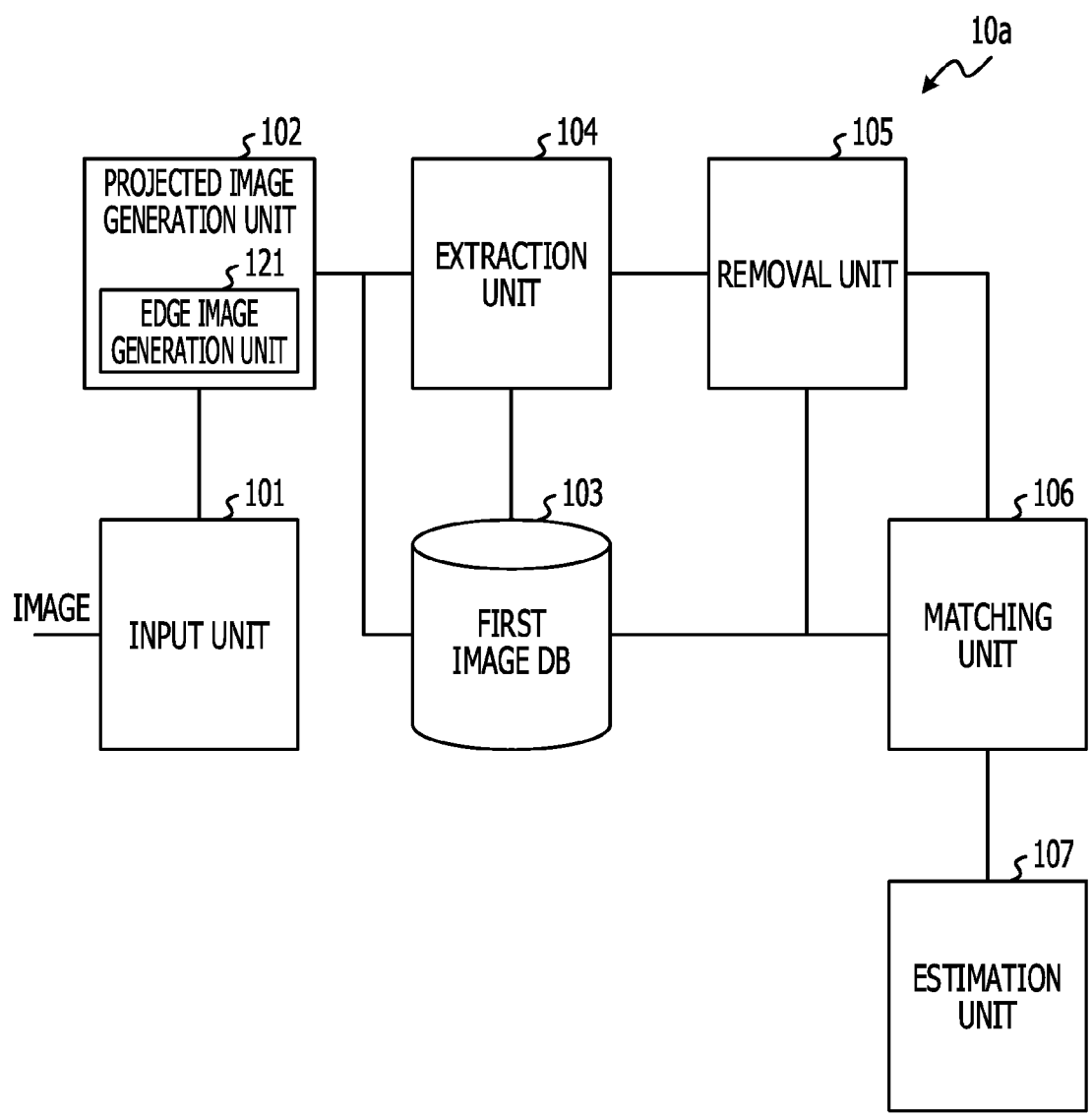
FIG. 3 is a block diagram illustrating an example of the functionality of an image processing device in the first embodiment.

FIG. 3 is a block diagram illustrating an example of the function of an image processing device 10a in the first embodiment. Hereinafter, when the function of the image processing device 10 in the first embodiment is described, the image processing device 10 is expressed as the image processing device 10a. The image processing device 10a illustrated in FIG. 3 includes an input unit 101, a projected image generation unit 102, a first image database (DB) 103, an extraction unit 104, a removal unit 105, a matching unit 106, and an estimation unit 107.

The input unit 101 may be realized by, for example, the image capturing unit I/F 16. The projected image generation unit 102, the extraction unit 104, the removal unit 105, the matching unit 106, and the estimation unit 107 may be realized by, for example, the control unit 11 executing the image processing program and the main storage unit 12 serving as a working memory. The first image DB 103 may be realized by, for example, the main storage unit 12 or the auxiliary storage unit 13.

The input unit 101 is mounted in the movable body, and inputs a captured image from the image capturing unit 20 capturing the image of surroundings that includes the road surface. In addition, with an analog image, the input unit 101 performs digital conversion, and with a digital image, the input unit 101 input the digital image.

In addition, with a color image, the input unit 101 converts the color image into a monochrome image, stores the monochrome image within a given memory, and outputs the monochrome image to the projected image generation unit 102. The input unit 101 inputs a captured image from at least one image capturing unit 20 (for example, the image capturing unit A 20-1), and when a plurality of the image capturing units 20 are mounted, the input unit 101 inputs captured images from the individual image capturing units 20, and individually stores each captured image within a given memory.

The projected image generation unit 102 uses individual captured images from the image capturing unit 20 to generate a projected image indicating an image onto which a lower surface side, which includes the movable body, is projected from above. For example, the projected image generation unit 102 generates a projected image (for example, a grayscale image) corresponding to when the road surface is viewed from above. The projected image generation unit 102 outputs the generated projected image to an edge image generation unit 121.

Here, processing to generate a projected image will be described.

(Road Surface Projection Image Creation Processing)

The projected image generation unit 102 configures a movable body coordinate system M-XYZ defined in the movable body. Here, the origin is set on the road surface, the traveling direction is defined as the y-axis, a lateral direction is defined as the x-axis, and a direction pointing up from the road surface is defined as the z-axis.

At this point, the road surface coordinate system becomes O-XY. The attachment position of an mth image capturing unit, expressed in the movable body coordinate system, is expressed by Rm (a rotation matrix) and Tm (a translation vector). The size of an actual road surface corresponding to the size of one pixel in a projected image is expressed by MX and MY.

In addition, the size of the projected image is expressed by wx and wy, and the center position of the projected image is expressed by (cx, cy). However, hx=wx/2 and hy=wy/2 is satisfied. At this point, a pixel value v with respect to the position (x, y) of the projected image is given by the following expressions.

$$v = pm(px, py) \quad \text{Expression (1)}$$

$$px = fx \times r \times \cos(\phi) + cx \quad \text{Expression (2)}$$

$$py = fy \times r \times \sin(\phi) + cy \quad \text{Expression (3)}$$

$$r = \tan(\theta) \quad \text{Expression (4)}$$

$$\theta = \arctan(\sqrt{QX^2 + QY^2}/QZ) \quad \text{Expression (5)}$$

$$\phi = \arctan(QX/QY) \quad \text{Expression (6)}$$

$$QV = (QX, QY, QZ)^T \quad \text{Expression (7)}$$

$$QV = Rm^*(U - Tm) \quad \text{Expression (8)}$$

$$U = (UX, UY, 0) \quad \text{Expression (9)}$$

$$UX = MX \times (x - hx) \quad \text{Expression (10)}$$

$$UY = MY \times (y - hy) \quad \text{Expression (11)}$$

In this regard, however, it is assumed that (fx, fy) expresses the focal lengths of the image capturing unit 20 in a lateral direction and a longitudinal direction, (cx, cy) expresses an image center pixel position, and pm(px, py) expresses a pixel value in the position (px, py) of an mth captured image.

Figure 4:
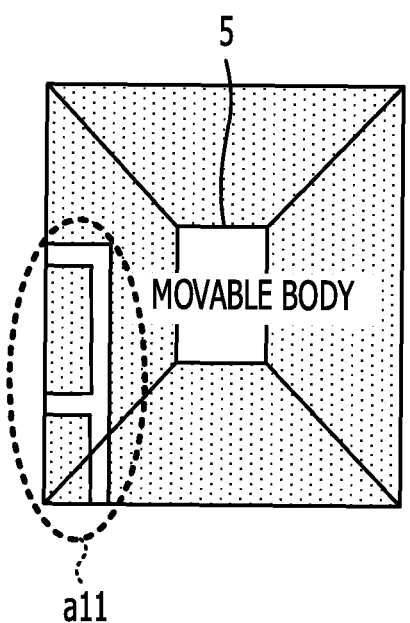
FIG. 4 is a diagram illustrating an example of a projected image.

Using the above expressions, it may be possible for the projected image generation unit 102 to generate a projected image that projects the road surface. FIG. 4 is a diagram illustrating an example of a projected image. The projected image illustrated in FIG. 4 corresponds to an image on which a road surface side that includes the movable body 5 is projected from above. In the example illustrated in FIG. 4, the pattern all of the road surface is included in the projected image. The movement amount of a movable body 5 is estimated by using the pattern all of the road surface.

Using an image captured by at least one or more image capturing units 20 mounted in the movable body, the edge image generation unit 121 generates a first edge image extracted from an image for a first time. It is assumed that a second time is after, for example, the first time.

For example, the edge image generation unit 121 acquires the projected image, performs edge extraction on the projected image, and generates an edge image. For processing at a subsequent time, the edge image generation unit 121 saves the edge image in the first image DB 103, and outputs the edge image to the extraction unit 104.

Specifically, the edge image generation unit 121 causes common differential operator such as, for example, Sobel, to act on the projected image, and thereby generate a video (for a Sobel operator, for example, refer to Gary Bradski and Adrian Kaehler, Learning OpenCV Computer Vision with the OpenCV Library, O'Reilly Media, September 2008).

After the differential processing, the edge image generation unit 121 performs a comparison with a predetermined threshold value, and performs noise removal processing to only retain an edge whose edge strength is greater than or equal to the threshold value. The edge image of a boundary where image brightness is greatly changed is obtained by means of the differential processing operations.

Figure 5:
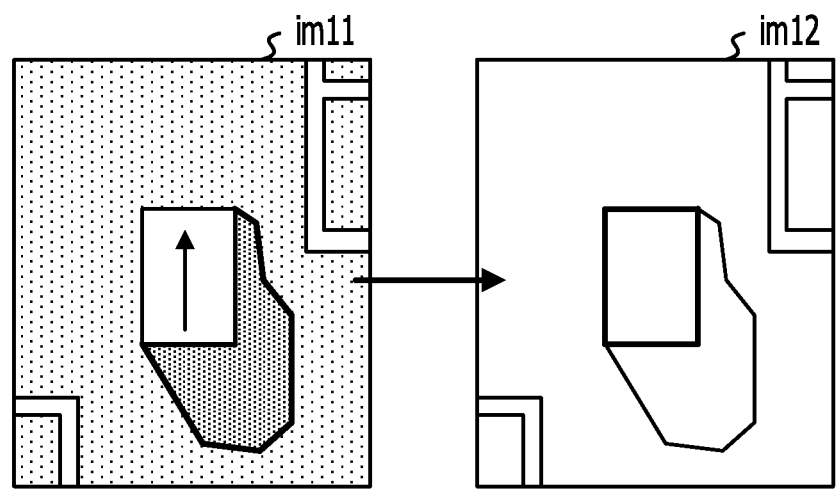
FIG. 5 is a diagram illustrating an example of a result of differential processing.

FIG. 5 is a diagram illustrating an example of a result of differential processing. In the example illustrated in FIG. 5, by performing the differential processing on a projected image im11 and performing a threshold value comparison, an edge image im12 is generated.

Returning to FIG. 3, the first image DB 103 stores therein, for example, edge images for the current time (for example, a second time) and for a time prior to the current time (for example, a first time). When the edge image for the current time (for example, a second edge image) is input, the first image DB 103 discards an edge image one time prior to the time prior to the current time, and stores therein the edge image for the current time and the edge image for the time prior to the current time (the first edge image). Hereinafter, the edge image for the time prior to the current time is defined as E1, and the edge image for the current time is expressed as E2.

The extraction unit 104 compares the first edge image (E1) and the second edge image (E2), and extracts an edge having a differing position. For example, the extraction unit 104 inputs the first edge image (E1) and the second edge image (E2) from the first DB 103, and superimposes the first edge image and the second edge image, extracts an edge having a differing position, and regards the edge as a shadow portion. The extraction unit 104 generates a shadow edge image (Es) that includes the edge regarded as the shadow portion. The extraction unit 104 outputs the generated shadow edge image to the removal unit 105.

The removal unit 105 removes an edge extracted by the extraction unit 104 from the first edge image and/or the second edge image. For example, the removal unit 105 removes the shadow edge image from the first edge image, and generates a non-shadow edge image. The removal unit 105 outputs the generated non-shadow edge image (Ens) to the matching unit 106.

The matching unit 106 performs matching processing on the first edge image and the second edge image, to either or both of which the edge of a shadow portion has been removed by the removal unit 105. The matching unit 106 performs, for example, perturbation matching on the non-shadow edge image (Ens) and the second edge image (E2), and calculates a perturbation amount where edge patterns coincide with each other most. The perturbation amount expresses a displacement amount between images.

Specifically, with the non-shadow edge image and the second edge image as subject matter, the matching unit 106 calculates the degree of coincidence between two images while displacing each subject-matter image by one pixel in each of a longitudinal direction and a lateral direction for a predetermined amount. The processing where an image is displaced by a preliminarily amount in each of a longitudinal direction and a lateral direction may be referred to as perturbation. The matching unit 106 defines, as a displacement amount, a perturbation amount where the degree of coincidence is the highest.

The estimation unit 107 uses the displacement amount between images subjected to matching by the matching unit 106 to estimate the movement amount of a movable body. For example, when an optimum perturbation amount (dxm, dym), which gives an optimum matching position, has been determined, if it is assumed that an area on the road surface, occupied by one pixel in the projected image, is WXX wide and WYY long, the estimation unit 107 obtains a movement amount (MX, MY) using the following expressions.

$$MX = dxm \times WXX \quad \text{Expression (12)}$$

$$MY = dym \times WYY \quad \text{Expression (13)}$$

With the above-mentioned configuration and function, when a movement amount is estimated by using an image captured from an image capturing unit mounted in a movable body, it may be possible to remove the influence of the shadow of the movable body projected in the captured image and adequately estimate the movement amount.

Specific Example

Figure 6:
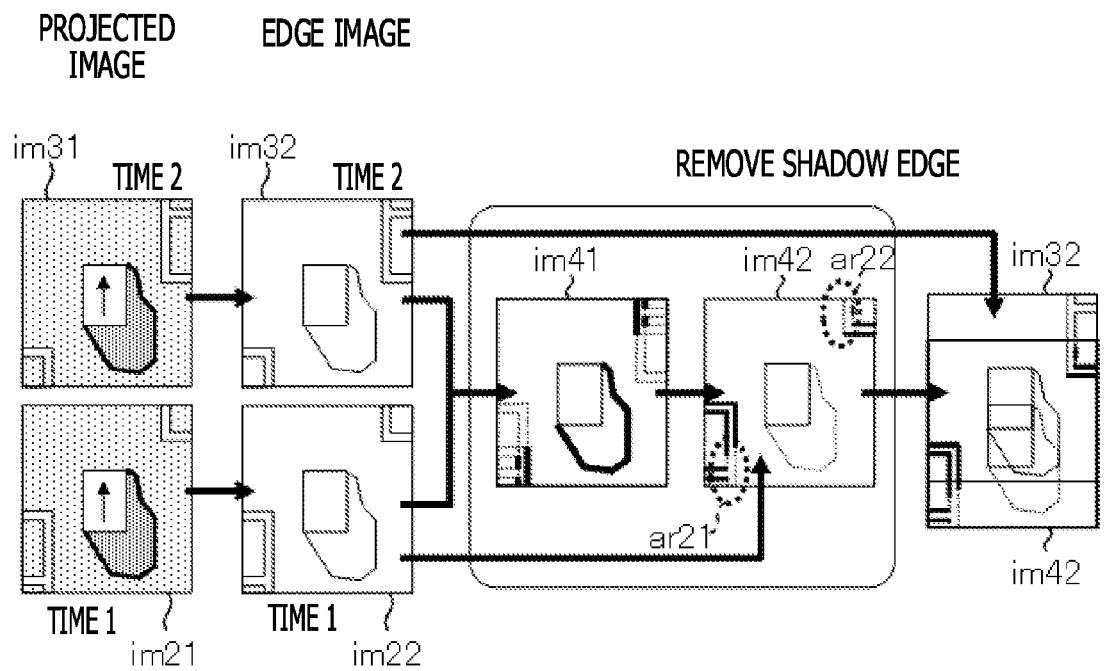
FIG. 6 is a diagram explaining movement amount estimation in the first embodiment.

Next, the flow for the estimation of the movement amount in the first embodiment will be described using a specific example. FIG. 6 is a diagram explaining the estimation of the movement amount in the first embodiment.

Here, as described above, attention is focused on that the shadow of a movable body is almost unchanged for a short period of time and the position of the shadow is almost unchanged. Accordingly, the image processing device 10a superimposes the edge images of individual projected images for at least two times with a relative movement amount set to zero, and estimates, as the shadow of the movable body, an area at which edge positions overlap with each other.

First, the projected image generation unit 102 generates an edge image im22 from a projected image im21 for a time 1. In addition, in the same way, the projected image generation unit 102 generates an edge image im32 from a projected image im31 for a time 2 (time 1<time 2).

Next, the extraction unit 104 superimposes the edge image im22 and the edge image im32 with a relative movement amount set to zero, and extracts an edge where edge positions overlap with each other. The extracted edge is regarded as a shadow caused by the movable body. The extraction unit 104 generates a shadow edge image im41 that includes the extracted edge.

Next, in this example, the removal unit 105 generates an edge image im42 where the shadow edge image im41 is removed from the edge image im22 for the time 1.

Next, the matching unit 106 compares the edge image im32 for the time 2 with the edge image im42, and obtains a displacement amount for between images where edge patterns coincide with each other most. The estimation unit 107 uses the obtained displacement amount to estimate the movement amount of the movable body.

In addition, while the edges of a region ar21 and a region ar22 in the edge image im42 are misidentified as the shadow of the movable body, the other edge patterns remain, and hence, the misidentification isn't likely to be a problem.

<Operation>

Figure 7:
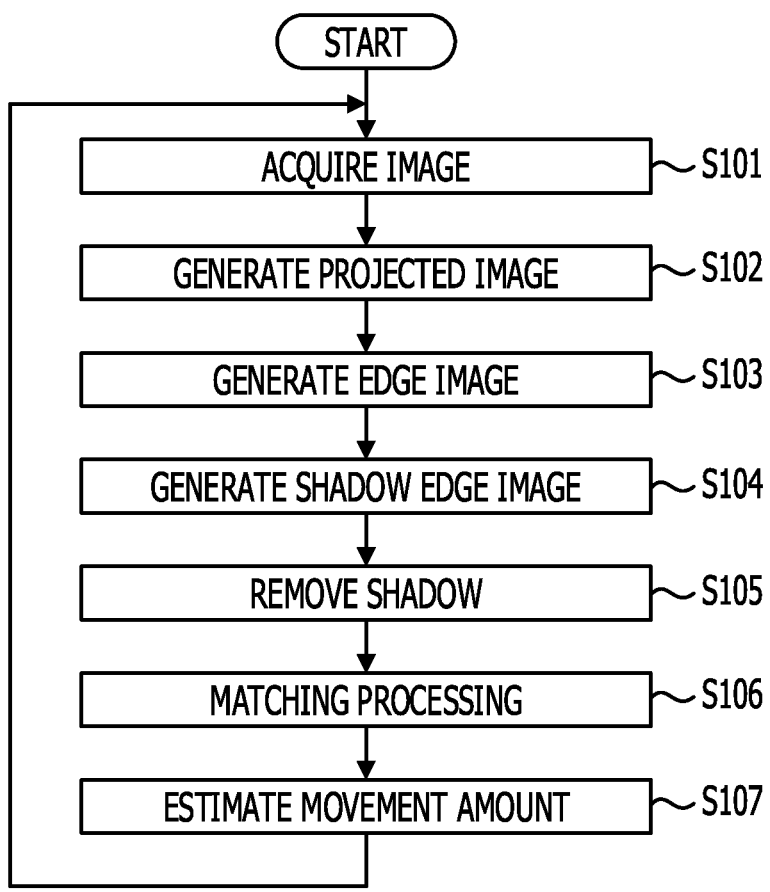
FIG. 7 is a flowchart illustrating an example of image processing in the first embodiment.

Next, operation of the image processing system 1 in the first embodiment will be described. FIG. 7 is a flowchart illustrating an example of image processing in the first embodiment. The processing illustrated in FIG. 7 is movement amount estimation processing performed when a second image or an image subsequent thereto is acquired. Processing operations in and before a step S103 are performed on the first image.

In a step S101, the input unit 101 acquires captured images from the individual image capturing units 20. In a step S102, the projected image generation unit 102 acquires, for example, captured images from the individual image capturing units 20, and generates a projected image corresponding to an image that projects the road surface, by converting and composing the captured images.

In the step S103, the edge image generation unit 121 extracts edges from the projected image, and generates an edge image.

In a step S104, the extraction unit 104 compares the edge image for the time 2, acquired from the edge image generation unit 121, and the edge image for the time 1, acquired from the first image DB 103, and generates a shadow edge image that includes edges whose edge positions are equal to each other.

In a step S105, the removal unit 105, for example, removes an edge included in the shadow edge image from the edge image for the time 1. An edge portion included in the shadow edge image is an edge estimated to be the shadow of the movable body.

In a step S106, the matching unit 106 uses the edge image for the time 1, from which a shadow has been removed, and the edge image for the time 2 to perform matching processing. By performing the matching processing, a displacement amount between images is obtained.

In a step S107, the estimation unit 107 uses the displacement amount acquired from the matching unit 106 to estimate the movement amount of the movable body.

(Processing to Generate Shadow Edge Image)

Figure 8:
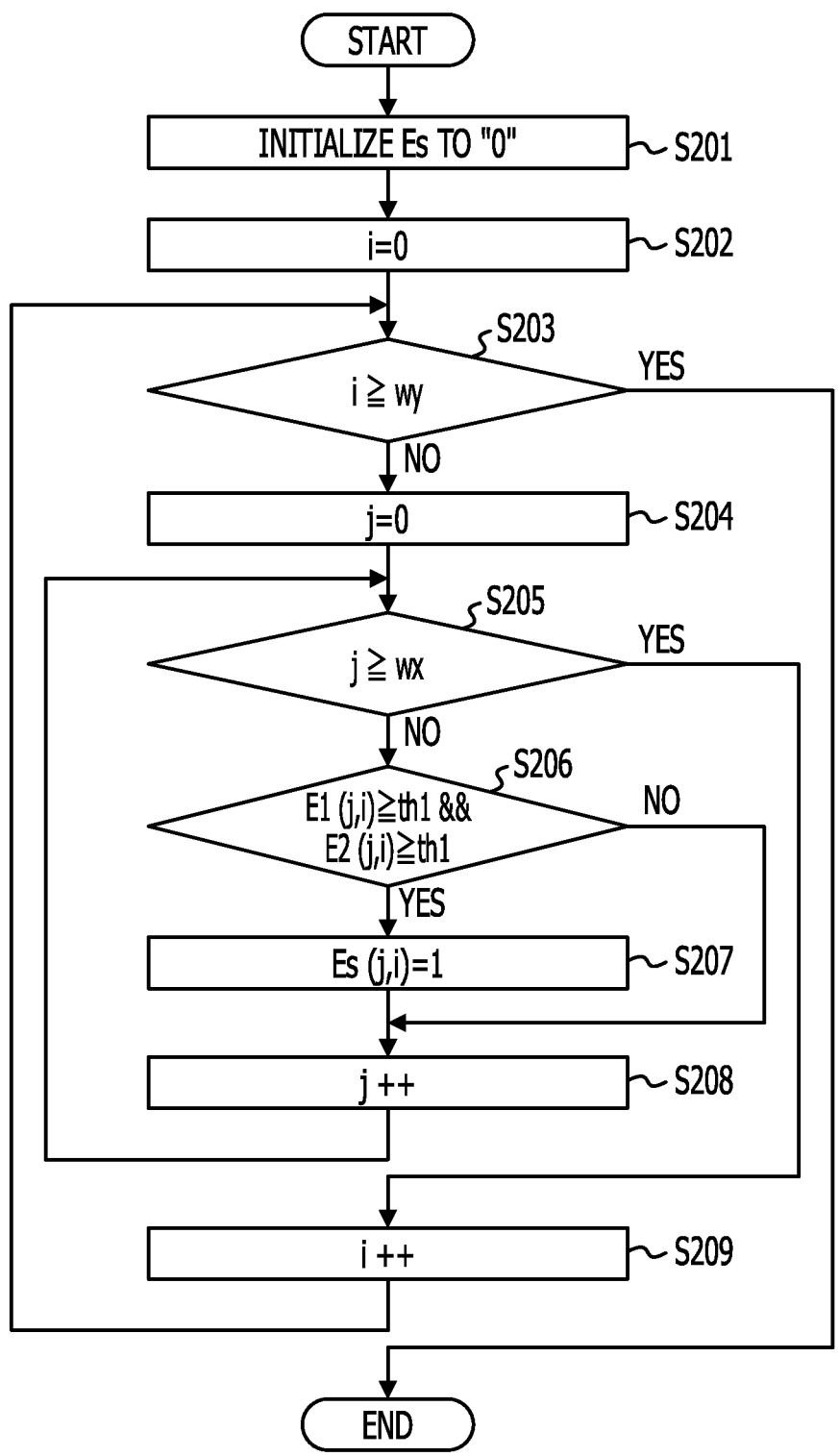
FIG. 8 is a flowchart illustrating an example of processing to generate a shadow edge image in the first embodiment.

FIG. 8 is a flowchart illustrating an example of processing to generate a shadow edge image in the first embodiment. Parameters used in the processing illustrated in FIG. 8 are as follows:

E1(x, y): a road surface projection edge image for a previous time ((x, y) indicates a pixel position within an image), E2(x, y): a road surface projection edge image for the current time ((x, y) indicates a pixel position within an image), Es(x, y): a flag image indicating the presence or absence of a shadow edge in a coordinate system for the previous time ((x, y) indicates a pixel position within an image and Es(x, y)=1 indicates being the shadow edge), and th1: a threshold value used to determine the presence of an edge, and as an example th1=1.

In step S201 illustrated in FIG. 8, the extraction unit 104 initializes Es to "0". In step S202, the extraction unit 104 sets a variable i to "0". The variable i is a parameter indicating the position of an image in a longitudinal direction.

In a step S203, the extraction unit 104 determines whether i is greater than or equal to wy. The variable wy represents the length of the image in the longitudinal direction. If i≥wy is satisfied (step S203—YES), the processing is terminated, and if i<wy is satisfied (step S203—NO), the processing proceeds to a step S204.

In step S204, the extraction unit 104 sets a variable j to "0". The variable j is a parameter indicating the position of the image in a lateral direction.

In step S205, the extraction unit 104 determines whether j is greater than or equal to wx. The variable wx represents the length of the image in the lateral direction. If j≥wx is satisfied (step S205—YES), the processing proceeds to a step S209, and if j<wx is satisfied (step S205—NO), the processing proceeds to a step S206.

In step S206, the extraction unit 104 determines whether the following condition (1) is satisfied.

$$E1(j,i) \geq th1 \text{ and } E2(j,i) \geq th1 \quad \text{condition (1)}$$

If condition (1) is satisfied (step S206—YES), the processing proceeds to step S207, and if condition (1) is not satisfied (step S206—NO), the processing proceeds to step S208.

In step S207, the extraction unit 104 assigns "1" to Es(j, i). In step S208, the extraction unit 104 increments j by one. After step S208, the processing returns to step S205.

In step S209, the extraction unit 104 increments i by one. After step S209, the processing returns to step S203.

By performing the above-mentioned processing, it may be possible to generate a shadow edge image (for example, the shadow edge image im41 in FIG. 6) that includes an edge regarded as a shadow.

(Processing to Generate Non-Shadow Edge Image)

Figure 9:
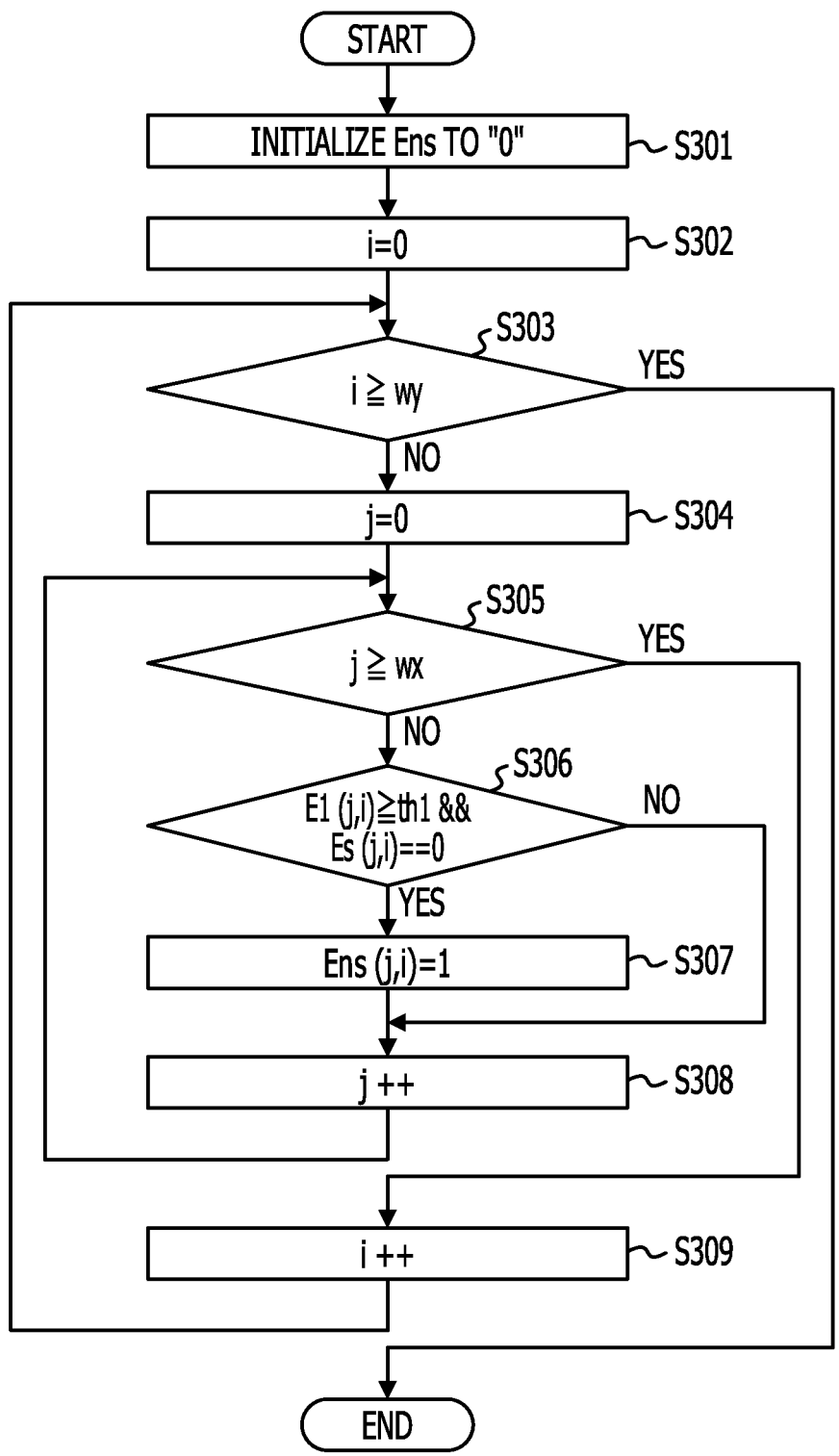
FIG. 9 is a flowchart illustrating an example of processing to generate a non-shadow edge image in the first embodiment.

FIG. 9 is a flowchart illustrating an example of processing to generate a non-shadow edge image in the first embodiment. A new parameter used in the processing illustrated in FIG. 9 is as follows.

Ens(x, y): a flag image indicating the presence or absence of a non-shadow edge in a coordinate system for a previous time ((x, y) indicates a pixel position within an image and Ens(x, y)=1 indicates being the non-shadow edge).

In step S301 illustrated in FIG. 9, the removal unit 105 initializes Ens to "0". In step S302, the removal unit 105 sets a variable i to "0". The variable i is a parameter indicating the position of an image in a longitudinal direction.

In step S303, the removal unit 105 determines whether i is greater than or equal to the wy. The variable wy represents the length of the image in the longitudinal direction. If i≥wy is satisfied (step S303—YES), the processing is terminated, and if i<wy is satisfied (step S303—NO), the processing proceeds to a step S304.

In step S304, the removal unit 105 sets a variable j to "0". The variable j is a parameter indicating the position of the image in the lateral direction.

In step S305, the removal unit 105 determines whether j is greater than or equal to wx. The variable wx expresses the length of the image in the lateral direction. If j≥wx is satisfied (step S305—YES), the processing proceeds to a step S309, and if j<wx is satisfied (step S305—NO), the processing proceeds to a step S306.

In step S306, the removal unit 105 determines whether the following condition (2) is satisfied.

$$E1(j,i) \geq th1 \text{ and } Es(j,i)=0 \quad \text{condition (2)}$$

If condition (2) is satisfied (step S306—YES), the processing proceeds to a step S307, and if condition (2) is not satisfied (step S306—NO), the processing proceeds to step S308.

In step S307, the removal unit 105 assigns "1" to Ens(j, i). In step S308, the removal unit 105 increments j by one. After step S308, the processing returns to step S305.

In step S309, the removal unit 105 increments i by one. After step S309, the processing returns to step S303.

By performing the above processing, it may be possible to generate a shadow edge image (for example, the non-shadow edge image im42 in FIG. 6) that includes an edge regarded as a shadow. In addition, while having been described after being divided into FIG. 8 and FIG. 9, the processing to generate the shadow edge image and the non-shadow edge image may also be organized into one processing operation.

As described above, according to the first embodiment, when the movement amount of a movable body is estimated using an image captured by an image capturing unit mounted in the movable body, it may be possible to adequately estimate the movement amount of the movable body.

Second Embodiment

Next, an image processing system in a second embodiment will be described. In the second embodiment, by generating a weighted image that includes weight coefficients for a shadow portion and a non-shadow portion, it may be possible to cause the influence of each unit to be variable.

<Configuration>

Since the configuration of the image processing system in the second embodiment is the same as the configuration in the first embodiment illustrated in FIG. 2, the same symbols will be used.

<Function>

Figure 10:
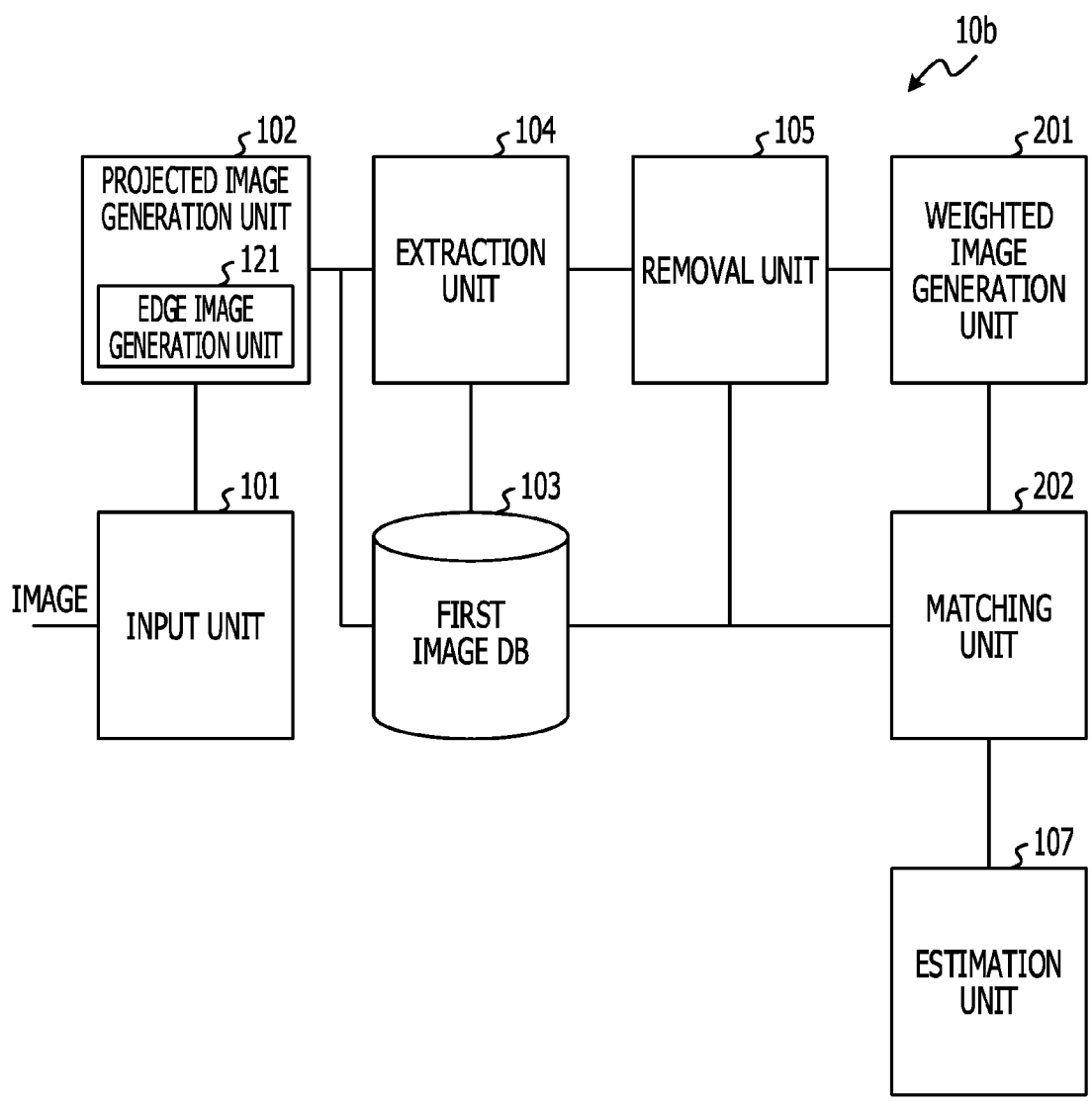
FIG. 10 is a block diagram illustrating an example of functionality of an image processing device in a second embodiment.

FIG. 10 is a block diagram illustrating an example of the function of an image processing device 10b in the second embodiment. Hereinafter, when the function of the image processing device 10 in the second embodiment is described, the image processing device 10 is expressed as the image processing device 10b. The image processing device 10b illustrated in FIG. 10 includes the input unit 101, the projected image generation unit 102, the first image DB 103, the extraction unit 104, the removal unit 105, a weighted image generation unit 201, a matching unit 202, and the estimation unit 107. Hereinafter, functions different from the first embodiment will be mainly described.

The weighted image generation unit 201 may be realized by, for example, the control unit 11 executing the image processing program and the main storage unit 12 serving as a working memory.

The weighted image generation unit 201 generates a weighted image that includes weight coefficients different in a first edge group, which includes an edge extracted by the extraction unit 104, and a second edge group, which includes an edge other than the first edge group, from among the edges of the edge image (E1) for the time 1. For example, with the shadow edge image Es and the non-shadow edge image Ens as inputs from the removal unit 105, the weighted image generation unit 201 generates the weighted image W(x, y) of an edge to be used in matching processing.

Specifically, the weighted image generation unit 201 assigns a weight coefficient w2 to a position having the value of "1" in the non-shadow edge image, and assigns a weight coefficient w1 to a position having the value of "1" in the shadow edge image. Owing to this, a weighted image that includes weight coefficients is generated.

The matching unit 202 uses the weighted image W to obtain the degree of coincidence between the first edge image (E1) for the time 1 and the second edge image (E2) for the time 2, and uses the degree of coincidence to perform matching processing. For example, the matching unit 202 acquires the first edge image (E1) and the second edge image (E2) from the first image DB 103, performs perturbation matching between both of the edge images, using the weighted image W acquired from the weighted image generation unit 201, and calculates a perturbation amount where edge patterns coincide with each other most. In the same way as in the first embodiment, the estimation unit 107 estimates the movement amount of a movable body on the basis of the perturbation amount.

The above-mentioned configuration and function are included, and hence, by generating a weighted image that includes the weight coefficients of a shadow portion and a non-shadow portion, it may be possible for the image processing device 10b in the second embodiment to cause the influence of each unit to be variable.

(Weighted Image)

Figure 11:
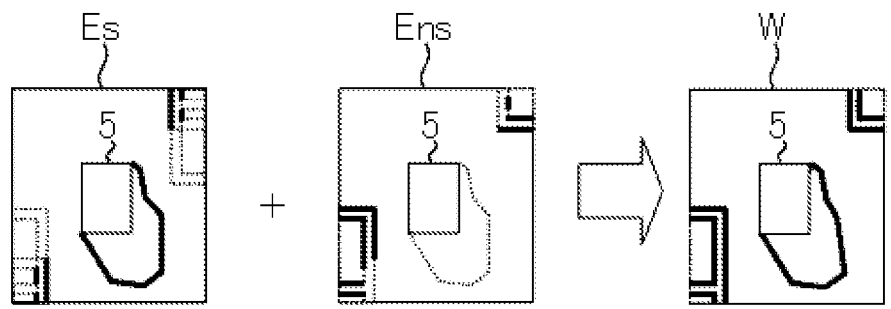
FIG. 11 is a diagram explaining generation of a weighted image in the second embodiment.

Next, the weighted image W in the second embodiment will be described. FIG. 11 is a diagram explaining the generation of a weighted image in the second embodiment. In the example illustrated in FIG. 11, when the weight coefficient w1 has been assigned to a position having the value of "1" in the shadow edge image (Es) and the weight coefficient w2 has been assigned to a position having the value of "1" in the non-shadow edge image (Ens), the weighted image W is generated. In addition, it is assumed that the relationship between the w2 and the w1 satisfies w2>w1. Accordingly, it may be possible to reduce the influence of a shadow portion, compared with a non-shadow portion.

<Operation>

Figure 12:
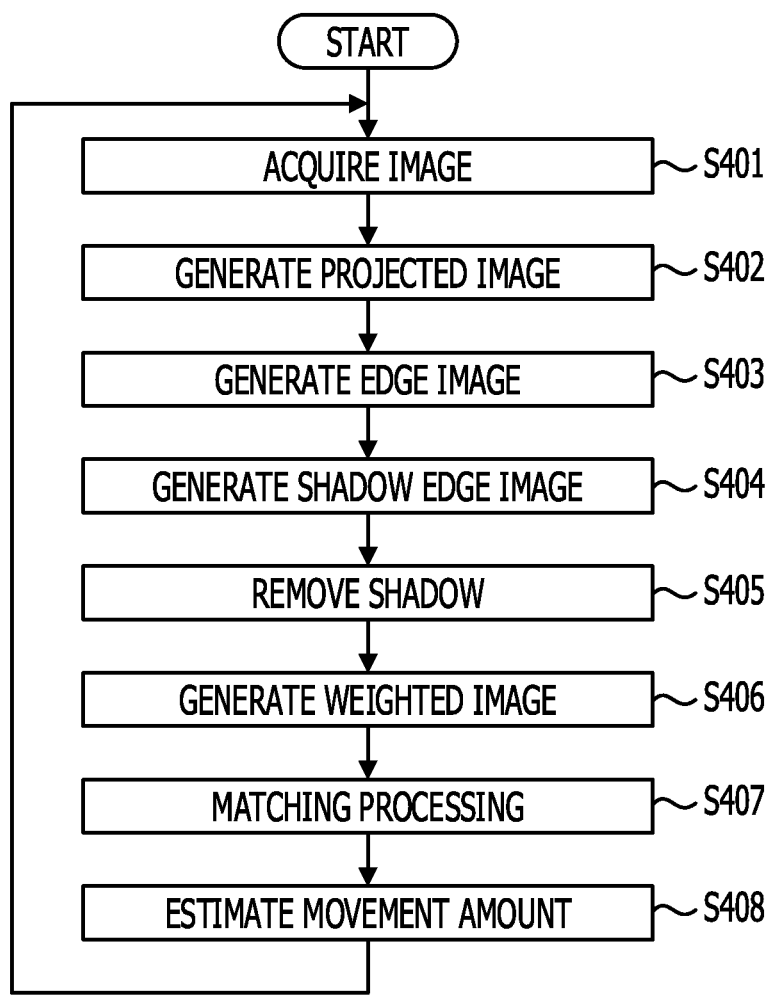
FIG. 12 is a flowchart illustrating an example of image processing in the second embodiment.

Next, the operation of the image processing system in the second embodiment will be described. FIG. 12 is a flowchart illustrating an example of image processing in the second embodiment. The processing illustrated in FIG. 12 is movement amount estimation processing performed when the second image or an image subsequent thereto is acquired. Processing operations in and before a step S403 are performed on the first image.

Processing operations in steps S401 to S405 are the same as the processing operations in steps S101 to S105 illustrated in FIG. 7.

In step S406, the weighted image generation unit 201 uses the shadow edge image (Es) and the non-shadow edge image (Ens) to generate a weighted image that includes weight coefficients different between the shadow portion and the non-shadow portion.

In step S407 the matching unit 202 uses the first edge image (E1), the second edge image (E2), and the weighted image W to perform matching processing. By performing the matching processing, a displacement amount between images is obtained.

In step S408 the estimation unit 107 uses the displacement amount acquired from the matching unit 202 to estimate the movement amount of the movable body.

(Weighted Image Generation Processing)

Figure 13:
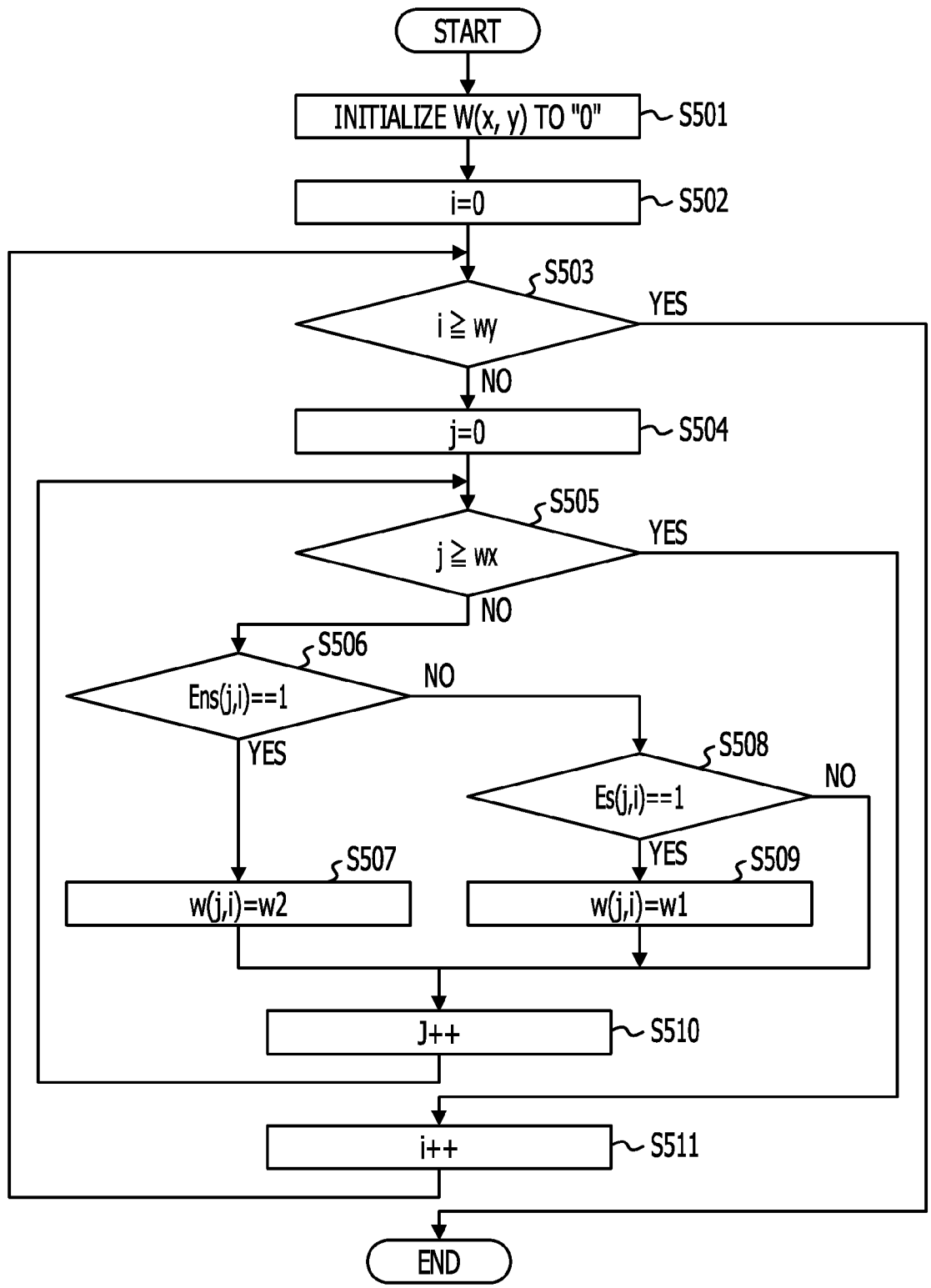
FIG. 13 is a flowchart illustrating an example of weighted image generation processing in the second embodiment.

FIG. 13 is a flowchart illustrating an example of weighted image generation processing in the second embodiment. Parameters used in the processing illustrated in FIG. 13 are as follows:

W(x, y): a weighted image that includes a weight coefficient ((x, y) indicates a pixel position within the image).

In step S501 illustrated in FIG. 13, the weighted image generation unit 201 initializes the weighted image W(x, y) to "0". In a step S502, the weighted image generation unit 201 sets i to "0".

In step S503, the weighted image generation unit 201 determines whether i is greater than or equal to the wy. If i≥wy is satisfied (step S503—YES), the processing is terminated, and if i<wy is satisfied (step S503—NO), the processing proceeds to step S504. In step S504, the weighted image generation unit 201 sets j to "0".

In step S505, the weighted image generation unit 201 determines whether j is greater than or equal to wx. If j≥wx is satisfied (step S505—YES), the processing proceeds to step S511, and if j<wx is satisfied (step S505—NO), the processing proceeds to step S506.

In step S506, the weighted image generation unit 201 determines whether the Ens(j, i) within the non-shadow edge image is "1". If Ens(j, i) is "1" (step S506—YES), the processing proceeds to step S507, and if Ens(j, i) is not "1" (step S506—NO), the processing proceeds to a step S508.

In step S507, the weighted image generation unit 201 assigns the weight coefficient w2 to W(j, i).

In step S508, the weighted image generation unit 201 determines whether the Es(j, i) within the shadow edge image is "1". If Es(j, i) is "1" (step S508—YES), the processing proceeds to step S509, and if Es(j, i) is not "1" (step S508—NO), the processing proceeds to a step S510.

In step S509, the weighted image generation unit 201 assigns the weight coefficient w1 to the W(j, i).

In step S510, the weighted image generation unit 201 increments j by one. After step S510, the processing returns to the step S505.

In step S511, the weighted image generation unit 201 increments i by one. After step S511, the processing returns to the step S503.

Owing to the above processing, it may be possible to generate a weighted image that includes weight coefficients different between the shadow portion and the non-shadow portion.

(Matching Processing)

Figure 14A:
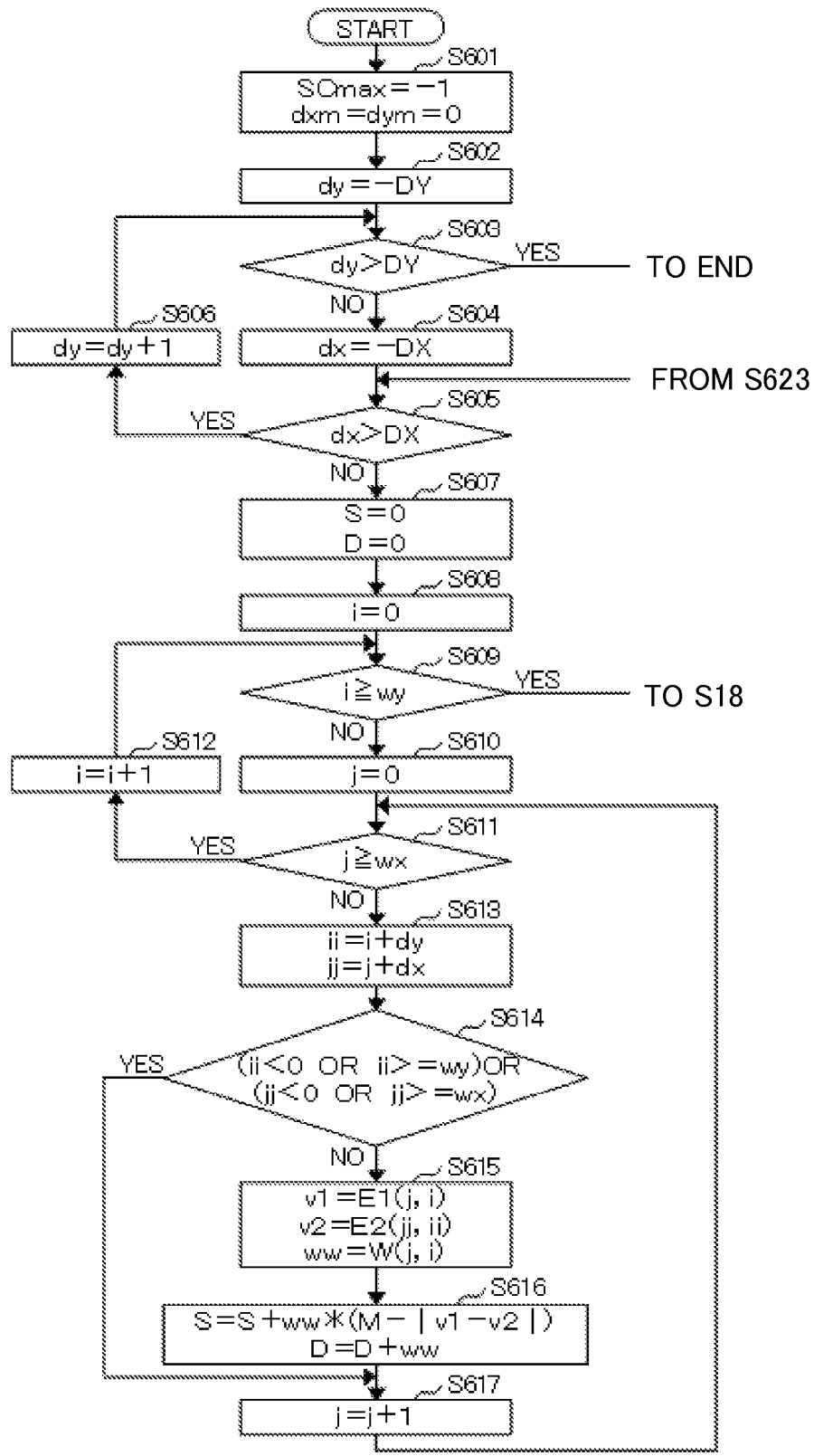
FIG. 14A and FIG. 14B are flowcharts illustrating an example of matching processing in the second embodiment.
Figure 14B:
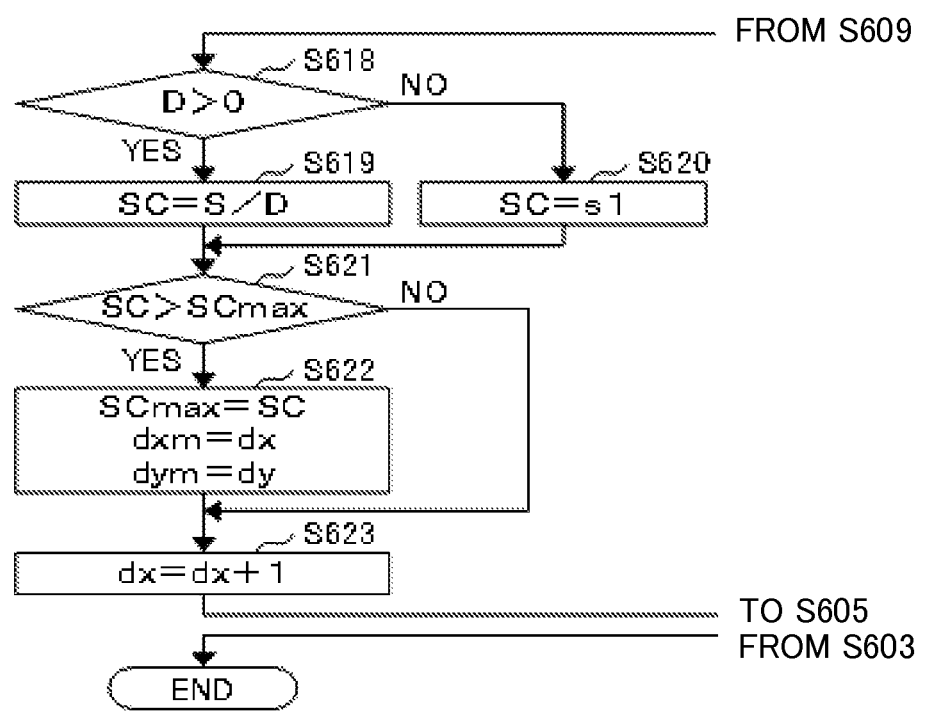

FIG. 14A and FIG. 14B are flowcharts illustrating an example of matching processing in the second embodiment. New parameters used in the processing illustrated in FIG. 14A and FIG. 14B are flowcharts are as follows:

SC: a score value,

SCmax: a maximum score value, (wx, wy): the lateral width and longitudinal width of an edge image, (DX, DY): given numbers predetermined for both of a lateral direction perturbation amount and a longitudinal direction perturbation amount (an example: (10, 10)), S: an edge score addition value, D: a weight addition value, (dx, dy): a perturbation value, (i, j): the position of the edge image (E1) within an image, (ii, jj): the position of the edge image (E2) within an image, (dxm, dym): an optimum perturbation amount that gives an optimum score value, and M: a given large number (for example, 1000).

In a step S601 illustrated in FIG. 14A, the matching unit 202 sets SCmax to "−1", and sets dxm and the dym to "0". In a step S602, the matching unit 202 sets dy to −DY.

In step S603, the matching unit 202 determines whether dy>DY is satisfied. If dy>DY is satisfied (step S603—YES), the processing is terminated, and if dy>DY is not satisfied (step S603—NO), the processing proceeds to a step S604. In the step S604, the matching unit 202 sets the dx to −DY.

In step S605, the matching unit 202 determines whether dx>DX is satisfied. If dx>DX is satisfied (step S605—YES), the processing proceeds to step S606, and if dx>DX is not satisfied (step S605—NO), the processing proceeds to step S607. In step S606, the matching unit 202 increments dy by one.

In step S607, the matching unit 202 sets S to "0", and sets D to "0". In step S608, i is set to "0".

In step S609, the matching unit 202 determines whether i≥wy is satisfied. If i≥wy is satisfied (step S609—YES), the processing proceeds to step S618, and if i≥wy is not satisfied (step S609—NO), the processing proceeds to step S610. In step S610, the matching unit 202 sets j to "0".

In step S611, the matching unit 202 determines whether j≥wx is satisfied. If j≥wx is satisfied (step S611—YES), the processing proceeds to step S612, and if j≥wx is not satisfied (step S611—NO), the processing proceeds to step S613. In step S612, the matching unit 202 increments i by one.

In step S613, the matching unit 202 performs the following calculation.

$$ii = i + dy \qquad \text{Expression (14)}$$

$$jj = j + dx \qquad \text{Expression (15)}$$

In step S614, the matching unit 202 determines whether the following condition (3) is satisfied.

$$(ii<0 \text{ or } ii \geq wy) \text{ or } (jj<0 \text{ or } jj \geq wx) \qquad \text{condition (3)}$$

Condition (3) is a condition used to determine whether edge images overlap with each other. If condition (3) is satisfied (step S614—YES), the processing proceeds to step S617, and if condition (3) is not satisfied (step S614—NO), the processing proceeds to step S615.

In step S615, the matching unit 202 performs the following setting:

$$v1 = E1(j,i),$$

$$v2 = E2(jj,ii), \text{ and}$$

$$ww = W(j,i).$$

In step S616, the matching unit performs the following calculation.

$$S = S + ww \times (M - |v1 - v2|) \qquad \text{Expression (16)}$$

$$D = D + ww \qquad \text{Expression (17)}$$

In step S617, the matching unit 202 increments j by one. After the processing operation in step S617, the processing returns to step S611.

In step S618, the matching unit 202 determines whether D>0 is satisfied. If D>0 is satisfied (step S618—YES), the processing proceeds to step S619, and if D>0 is not satisfied (step S618—NO), the processing proceeds to a step S620.

In step S619, the matching unit 202 performs the following calculation.

$$SC = S/D \qquad \text{expression (18)}$$

In step S620, the matching unit 202 assigns the value of s1 to SC. The value of s1 is small and set in advance. The value of s1 is, for example, a negative value.

In step S621, it is determined whether SC>SCmax is satisfied. If SC>SCmax is satisfied (step S621—YES), the processing proceeds to step S622, and if SC>SCmax is not satisfied (step S621—NO), the processing proceeds to step S623.

In step S622, the matching unit 202 performs the following setting:

$$SCmax = SC,$$

$$dxm = dx, \text{ and}$$

$$dym = dy.$$

In step S623, the matching unit 202 increments dx by one. After the processing operation in the step S623, the processing returns to the step S605.

With the above processing, it may be possible for the matching unit 202 to obtain a perturbation amount with a maximal score value.

In the above processing, while perturbing the edge image (E2) at the time 2 from −DX to DX in the lateral direction and from −DY to DY in the longitudinal direction with reference to the edge image (E1) at the time 1, the matching unit 202 compares both of the edge images with each other in individual perturbation positions. In addition, while calculating an edge score addition value (S) expressed by the following expression (19), the matching unit 202 calculates a perturbation position where the score value (SC) becomes maximum.

$$S = \sum_i \sum_j (W(j,i) * (M - |E1(j,i) - E2(j+dx, i+dy)|)) \qquad \text{Expression (19)}$$

As for a weight coefficient, for example, when w1=0 is satisfied, the same advantageous effect as the first embodiment may be obtained, and, for example, when w1=1 and w2=3 are satisfied, it may be possible to calculate a score value while the slight influence of a shadow edge still remains.

As described above, according to the second embodiment, when the movement amount of a movable body is estimated using an image captured by an image capturing unit mounted in the movable body, it may be possible to adequately estimate the movement amount of the movable body. In addition, according to the second embodiment, by generating a weighted image that includes the weight coefficients of a shadow portion and a non-shadow portion, it may be possible to cause the influence of each unit to be variable.

Third Embodiment

Next, an image processing system in a third embodiment will be described. In the third embodiment, from among edges removed as the shadow portion of a movable body, an edge that is estimated to be a portion other than the shadow of the movable body is supplemented. Therefore, it may be possible to improve the estimation accuracy of a movement amount.

<Configuration>

Since the configuration of the image processing system in the third embodiment is the same as the configuration in the first embodiment illustrated in FIG. 2, the same symbols will be used.

<Function>

Figure 15:
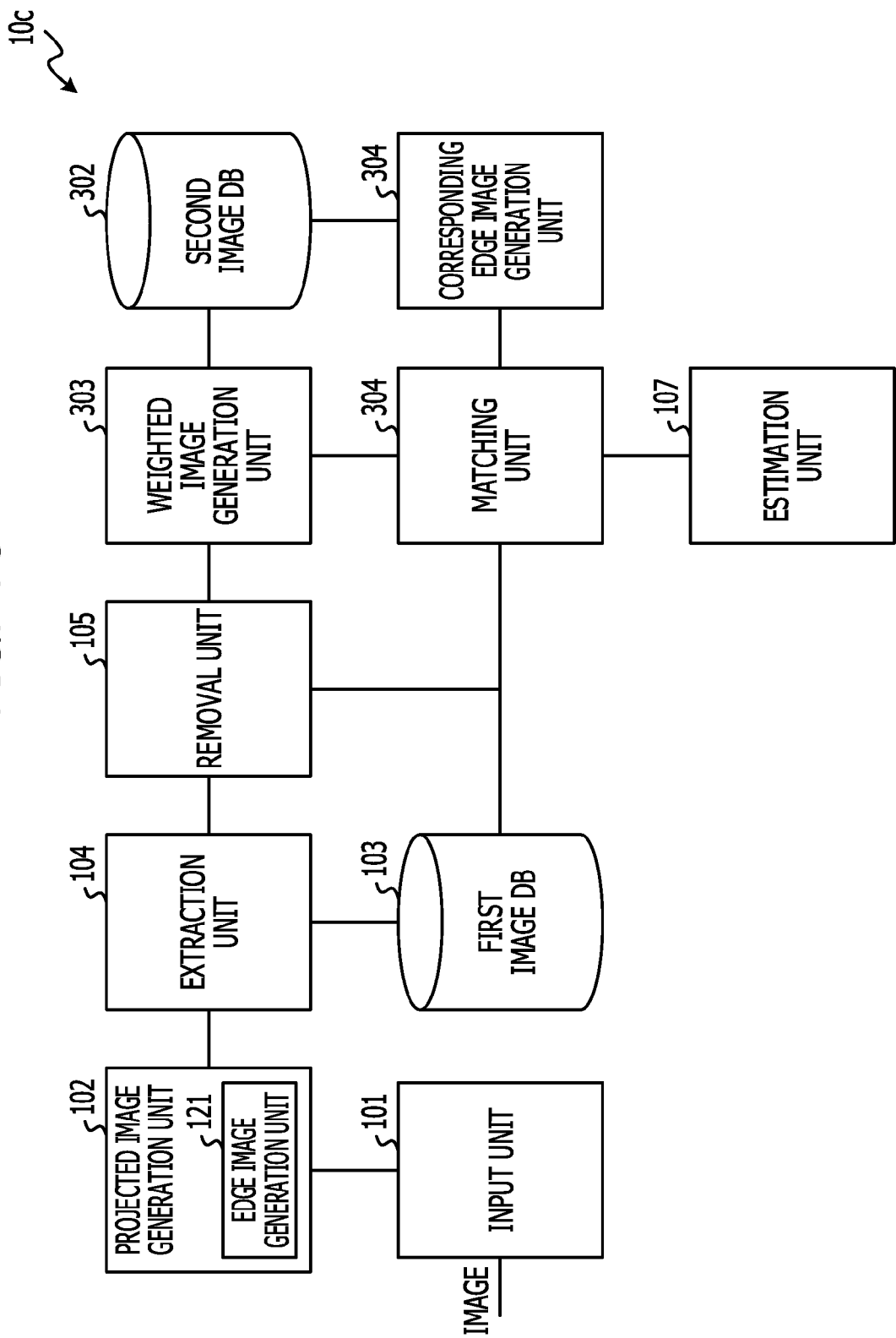
FIG. 15 is a block diagram illustrating an example of a function of an image processing device in a third embodiment.

FIG. 15 is a block diagram illustrating an example of the function of an image processing device 10c in the third embodiment. Hereinafter, when the function of the image processing device 10 in the third embodiment is described, the image processing device 10 is expressed as the image processing device 10c.

The image processing device 10c illustrated in FIG. 15 includes the input unit 101, the projected image generation unit 102, the first image DB 103, the extraction unit 104, the removal unit 105, a weighted image generation unit 303, a matching unit 304, the estimation unit 107, a corresponding edge image generation unit 301, and a second image DB 302. Hereinafter, functions different from the first or second embodiment will be mainly described.

The corresponding edge image generation unit 301 and the weighted image generation unit 303 may be realized by, for example, the control unit 11 executing the image processing program and the main storage unit 12 serving as a working memory. In addition, the second image DB 302 may be realized by, for example, the main storage unit 12 or the auxiliary storage unit 13.

The corresponding edge image generation unit 301 generates a third edge image (a corresponding edge image) that includes an edge where a correspondence has been established in the matching processing between the first edge image (E1) and the second edge image (E2). For example, when a displacement amount between the edge images for the time 1 and the time 2 has been obtained owing to the matching processing, the corresponding edge image generation unit 301 extracts an edge common to the edge images for the time 1 and the time 2 in a positional relationship that gives an optimum displacement amount. The corresponding edge image generation unit 301 generates a third edge image Em(x, y) that includes the extracted edge.

The second image DB 302 stores therein a second edge image Em generated in the corresponding edge image generation unit 301.

The weighted image generation unit 303 sets a weight coefficient so that the following relational expression is satisfied:

$$w2 > w3 > w1,$$

w1: a weight coefficient located in an edge other than the edges of a second edge group and a third edge image, from among the edges of a shadow edge image (a first edge group), w2: a weight coefficient located in an edge of a non-shadow edge image (a second edge group), and w3: a weight coefficient located in an edge other than the edge of the non-shadow edge image, from among the edges of the third edge image.

The generation of a weighted image in the third embodiment corresponds to supplementing an edge removed in the shadow edge image, using the third edge image. The reason why it may be called supplementing is that the third edge image is an edge where matching has been established in an edge pattern, likely to be, for example, a pattern on the road surface, and estimated not to be the shadow portion of a movable body.

For example, the weighted image generation unit 303 inputs, from the removal unit 105, the shadow edge image Es and the non-shadow edge image Ens, and inputs the third edge image from the second image DB 302, and generates the weighted image W(x, y) of an edge to be used in the matching processing.

The matching unit 304 uses the weighted image W to obtain the degree of coincidence between the first edge image (E1) for the time 1 and the second edge image (E2) for the time 2, and performs matching processing using the degree of coincidence. For example, the matching unit 304 acquires the first edge image (E1) and the second edge image (E2) from the first image DB 103, uses the weighted image W acquired from the weighted image generation unit 303 to perform perturbation matching between both of the edge images, and calculates a perturbation amount in which patterns maximally coincide with each other. In the same way as the first embodiment, the estimation unit 107 estimates the movement amount of the movable body on the basis of the perturbation amount.

The above configuration and function are included, and hence, by supplementing the non-shadow edge image using an edge having been coincident in the matching processing, it may be possible for the image processing device 10c in the third embodiment to improve matching accuracy and eventually improve the estimation accuracy of a movement amount.

Specific Example

Figure 16:
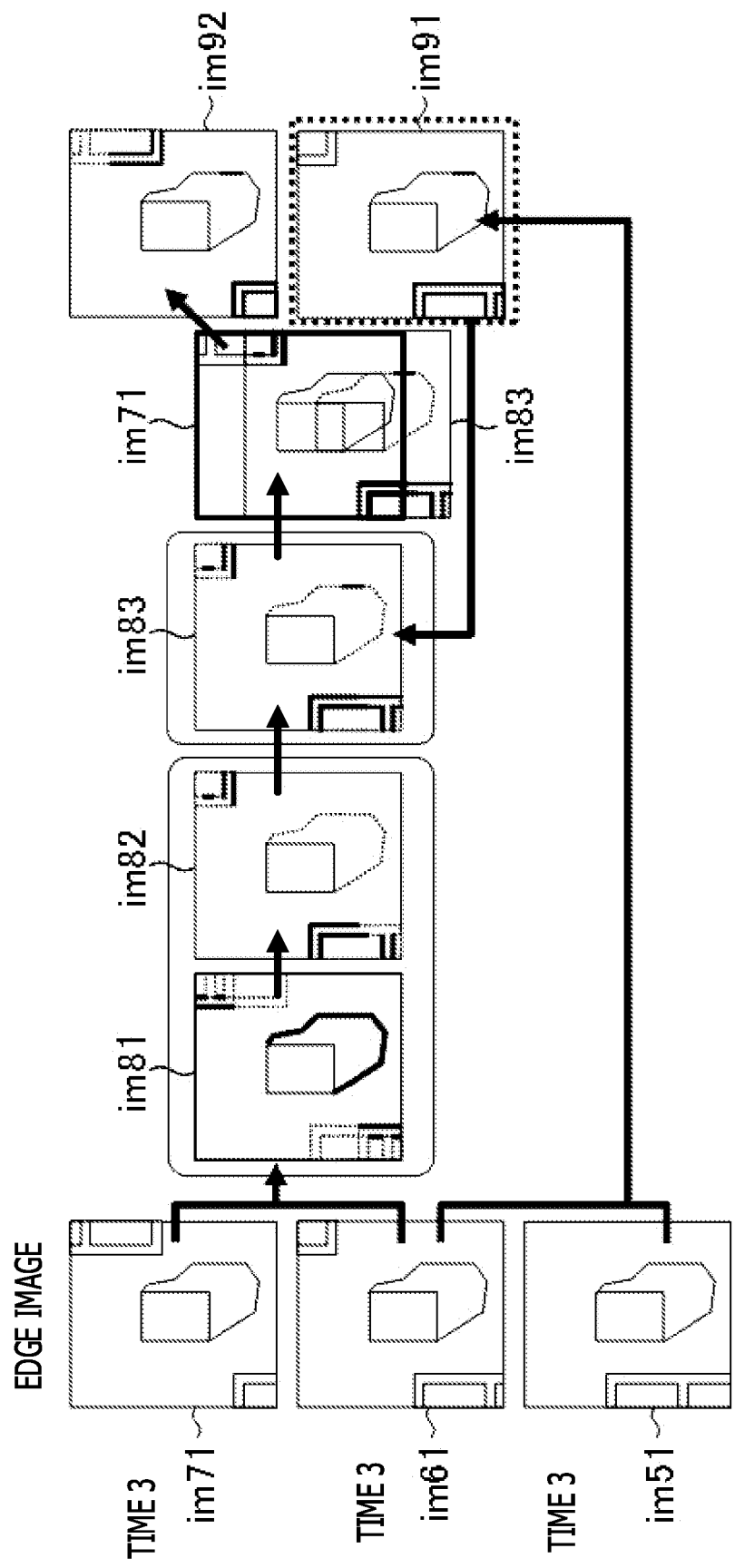
FIG. 16 is a diagram explaining movement amount estimation in the third embodiment.

Next, the flow of movement amount estimation in the third embodiment will be described using a specific example. FIG. 16 is a diagram explaining movement amount estimation in the third embodiment.

First, the image processing device 10c performs matching processing on edge images for the time 1 and the time 2, and estimates a movement amount. At this point, a third edge image im91 is generated that includes an edge portion that was coincident in the matching processing.

Next, the projected image generation unit 102 generates an edge image im61 from the projected image for the time 2. In addition, in the same way, the projected image generation unit 102 generates an edge image im71 from a projected image for a time 3 (the time 2<the time 3).

Next, the extraction unit 104 superimposes the edge image im61 and the edge image im71 with a relative movement amount set to zero, and extracts an edge where edge positions overlap with each other. The extracted edge is regarded as a shadow caused by the movable body. The extraction unit 104 generates a shadow edge image im81 that includes the extracted edge.

Next, in this example, the removal unit 105 generates an edge image im82 where the shadow edge image im81 is removed from the edge image im61 for the time 2.

Next, the weighted image generation unit 303 adds the third edge image im91 to the edge image im82, and generates an edge image im83 that has been subjected to supplementation.

Next, the matching unit 303 compares the edge image im71 for the time 3 with the edge image im83 that has been supplemented, and obtains a displacement amount between images where edge patterns most coincide with each other. The estimation unit 107 uses the obtained displacement amount to estimate the movement amount of the movable body.

Next, the corresponding edge image generation unit 301 generates an edge image im92 of the edge portion where a correspondence has been established in the matching processing.

Accordingly, it may become possible to only remove an edge estimated to be the shadow of the movable body, and it may be possible to improve the estimation accuracy of the movement amount.

(Weighted Image)

Figure 17:
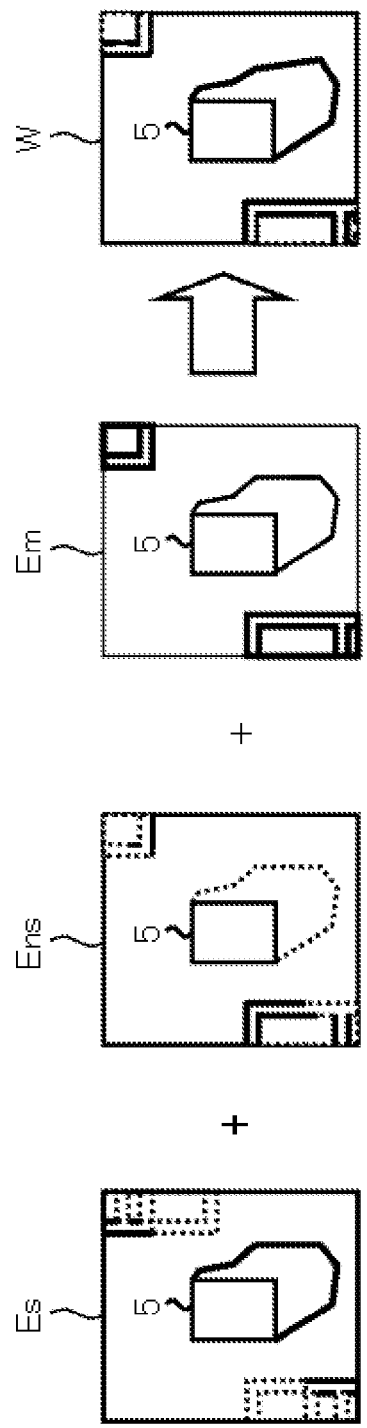
FIG. 17 is a diagram explaining generation of a weighted image in the third embodiment.

Next, the weighted image W in the third embodiment will be described. FIG. 17 is a diagram explaining the generation of a weighted image in the third embodiment. In the example illustrated in FIG. 17, when the weight coefficient w1 has been assigned to a position having the value of "1" in the shadow edge image (Es), the weight coefficient w2 has been assigned to a position having the value of "1" in the non-shadow edge image (Ens), and a weight coefficient w3 has been assigned to a position having the value of "1" in a corresponding edge image (Ems), the weighted image W is generated. In addition, it is assumed that a relationship among w3, w2, and w1 satisfies w3>w2>w1. Alternatively, w2 and w3 may be equal to each other. Accordingly, it may be possible to reduce the influence of the shadow portion of a movable body, compared with a non-shadow portion.

<Operation>

Figure 18:
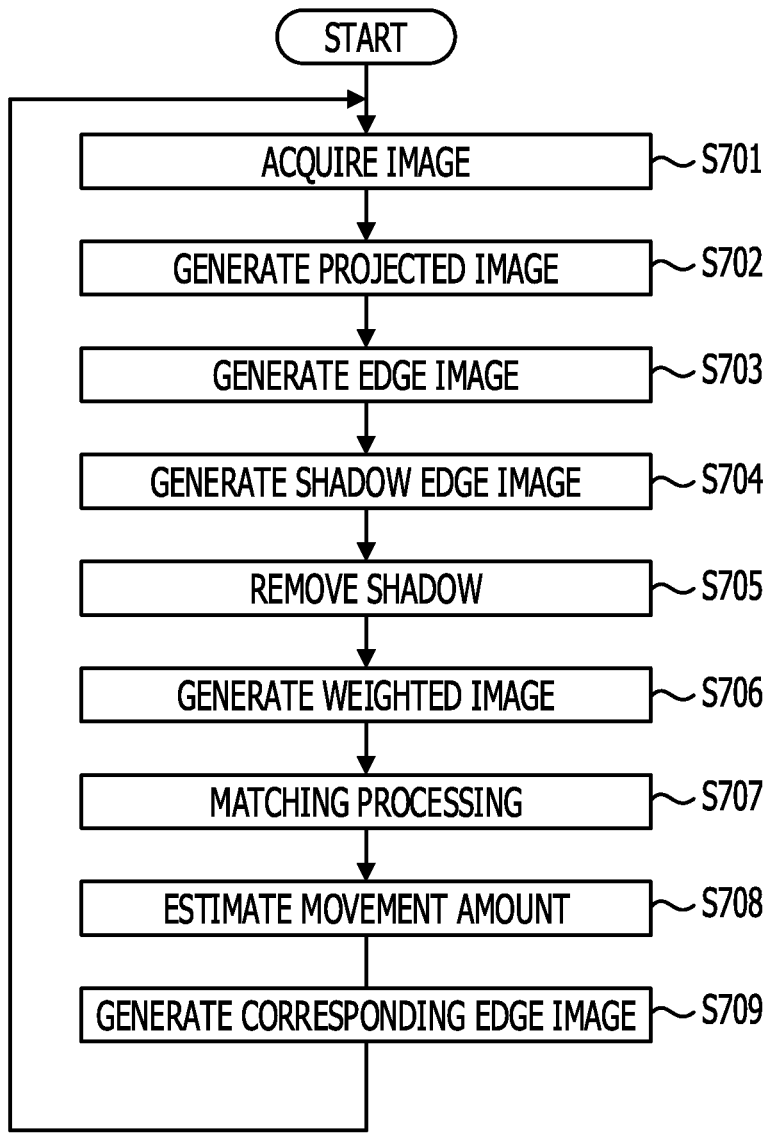
FIG. 18 is a flowchart illustrating an example of image processing in the third embodiment.

Next, the operation of the image processing system in the third embodiment will be described. FIG. 18 is a flowchart illustrating an example of image processing in the third embodiment. The processing illustrated in FIG. 18 is movement amount estimation processing performed when the second image or an image subsequent thereto is acquired. Processing operations in and before a step S703 are performed on the first image.

Processing operations in steps S701 to S705 are the same as the processing operations in the steps S101 to S105 illustrated in FIG. 7.

In step S706, the weighted image generation unit 303 uses the shadow edge image (Es), the non-shadow edge image (Ens), and the third edge image (Em) to generate a weighted image that includes weight coefficients that are different in the shadow portion, the non-shadow portion, and the corresponding edge portion.

In step S707, the matching unit 304 uses the first edge image (E1), the second edge image (E2), and the weighted image W to perform matching processing. By performing the matching processing, a displacement amount between images is obtained.

In step S708, the estimation unit 107 uses the displacement amount acquired from the matching unit 304 to estimate the movement amount of the movable body.

In step S709, the corresponding edge image generation unit 301 generates the third edge image that includes an edge portion where a correspondence has been established in the matching processing. In addition, the corresponding edge image generation unit 301 may also use an edge for which a correspondence has been established between images before the influence of a shadow is removed, and may also use an edge where a correspondence has been established between images from which the influence of a shadow has been removed.

(Corresponding Edge Image Generation Processing)

Figure 19:
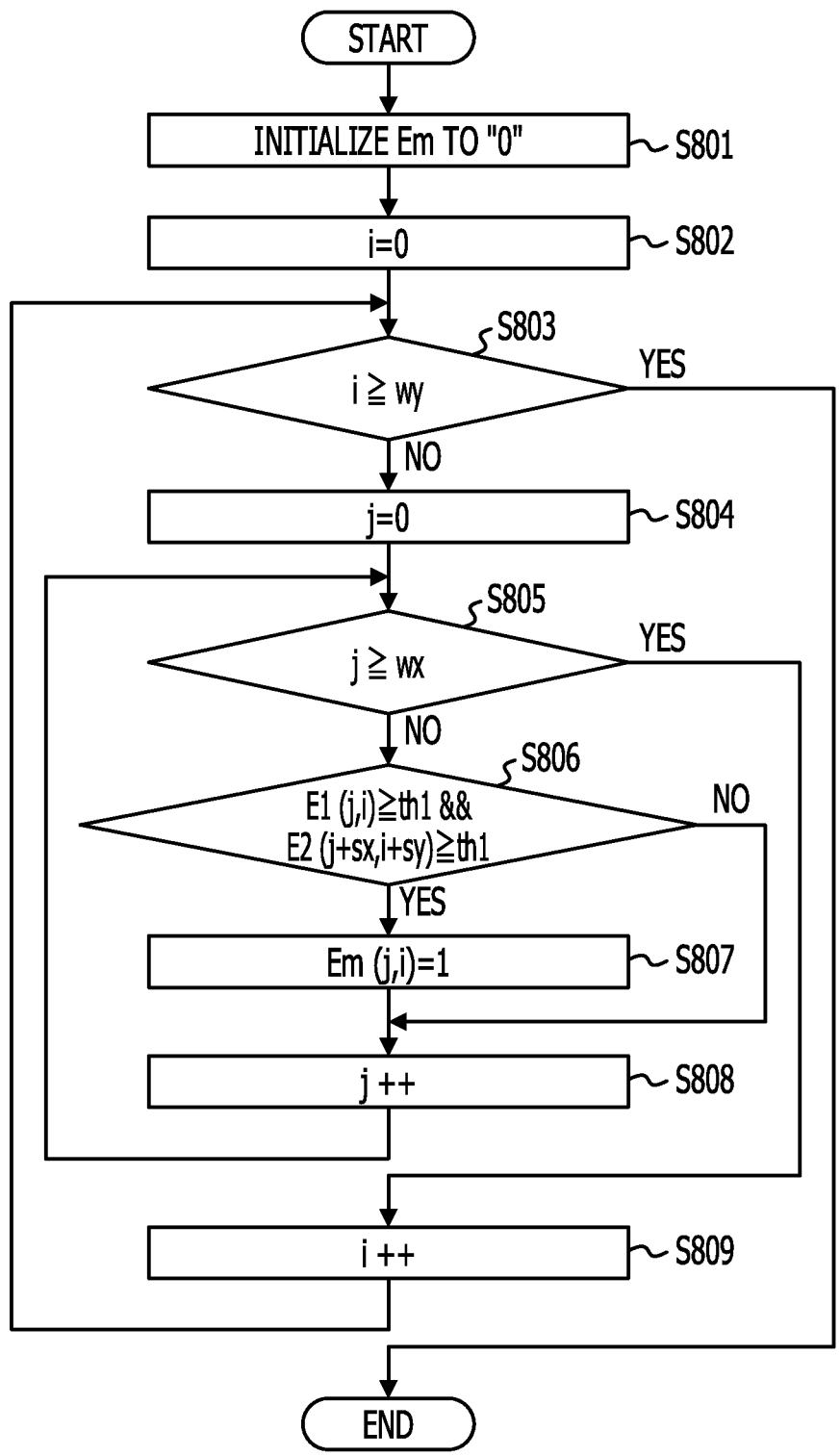
FIG. 19 is a flowchart illustrating an example of processing to generate a corresponding edge image in the third embodiment.

FIG. 19 is a flowchart illustrating an example of processing to generate a corresponding edge image in the third embodiment. Parameters used in the processing illustrated in FIG. 19 are as follows:

(sx, sy): the displacement amount of an image where edge images at a previous time and a current time most coincide with each other, the displacement amount being obtained in the matching processing, and Em(x, y): a flag image indicating the presence or absence of a corresponding edge in a coordinate system at the previous time ((x, y) indicates a pixel position within the flag image and Em(x, y)=1 indicates being the corresponding edge).

In step S801 illustrated in FIG. 19, the corresponding edge image generation unit 301 initializes Em to "0". In step S802, the corresponding edge image generation unit 301 sets i to "0". The variable i is a parameter indicating a position in a longitudinal direction of an image.

In step S803, the corresponding edge image generation unit 301 determines whether i is greater than or equal to wy. The value of wy represents the length of the image in the longitudinal direction. If i≥wy is satisfied (step S803—YES), the processing is terminated, and if i<wy is satisfied (step S803—NO), the processing proceeds to step S804.

In step S804, the corresponding edge image generation unit 301 sets a variable j to "0". The variable j is a parameter indicating a position in a lateral direction of the image.

In step S805, the corresponding edge image generation unit 301 determines whether j is greater than or equal to wx. The value of wx expresses the length of the image in the lateral direction. If j≥wx is satisfied (step S805—YES), the processing proceeds to step S809, and if j<wx is satisfied (step S805—NO), the processing proceeds to step S806.

In step S806, the corresponding edge image generation unit 301 determines whether the following condition (4) is satisfied.

$$E1(j,i) \geq th1 \text{ and } E2(j+sx,i+sy) \geq th1 \qquad \text{Condition (4)}$$

If condition (4) is satisfied (step S806—YES), the processing proceeds to step S807, and if condition (4) is not satisfied (step S806—NO), the processing proceeds to a step S808.

In the step S806, when intending to remove the influence of the shadow of the movable body and obtain the corresponding edge, the corresponding edge image generation unit 301 may use the following condition (5).

$$Ens(j,i)=1 \text{ and } E2(j+sx,i+sy) \geq th1 \qquad \text{Condition (5)}$$

In step S807, the corresponding edge image generation unit 301 assigns the value "1" to the Em(j, i). In step S808, the corresponding edge image generation unit 301 increments j by one. After step S808, the processing returns to step S805.

In step S809, the corresponding edge image generation unit 301 increments i by one. After step S809, the processing returns to step S803.

By performing the above-mentioned processing, it may be possible to generate a corresponding edge image (for example, the third edge image im91 or im92 illustrated in FIG. 16) that includes an edge (corresponding edge) where a correspondence has been established in the matching processing.

(Weighted Image Generation Processing)

Figure 20:
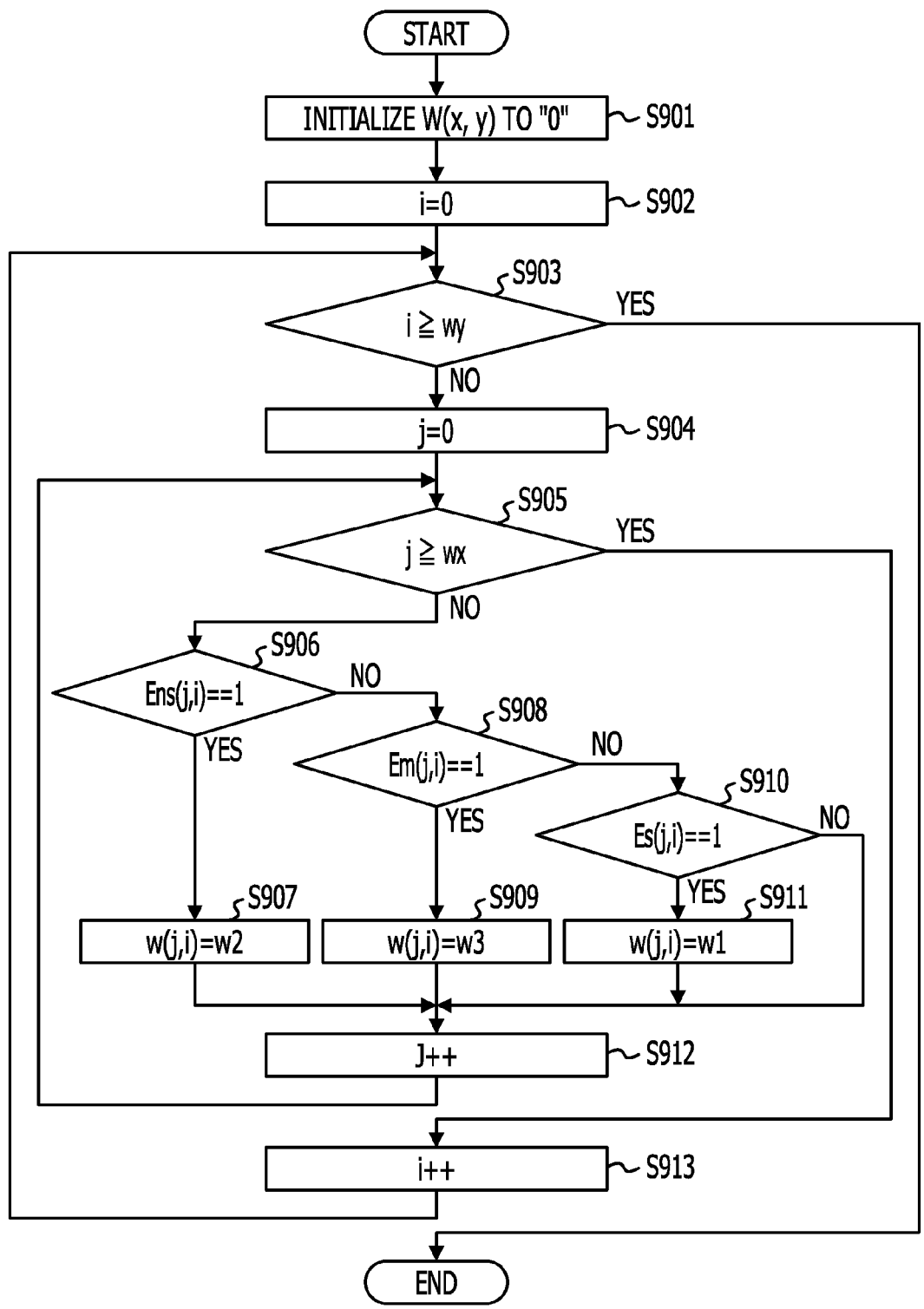
FIG. 20 is a flowchart illustrating an example of weighted image generation processing in the third embodiment.

FIG. 20 is a flowchart illustrating an example of weighted image generation processing in the third embodiment. Processing operations in steps S901 to S907 illustrated in FIG. 20 are the same as the processing operations in the steps S501 to S507 illustrated in FIG. 13.

In step S908, the weighted image generation unit 303 determines whether Em(j, i) within the corresponding edge image is "1". If Em(j, i) is "1" (step S908—YES), the processing proceeds to step S909, and if Em(j, i) is not "1" (step S908—NO), the processing proceeds to step S910.

In step S909, the weighted image generation unit 303 assigns the value of the weight coefficient w3 to W(j, i).

Processing operations in steps S910 to S913 are the same as the processing operations in the steps S508 to S511 illustrated in FIG. 13. In addition, the matching processing in the third embodiment is the same as the matching processing in the second embodiment.

According to the above processing, it may be possible to generate a weighted image that includes weight coefficients different in the shadow portion, the non-shadow portion, and the corresponding edge portion. In addition, the setting of w1=0 corresponds to when matching processing is performed using the non-shadow edge image where the corresponding edge has been complemented. In addition, as a special case, when only the non-shadow edge is used, the weighted image generation unit 303 may also set w1=w3=0 and set the w2 to a value other than "0".

As described above, according to the third embodiment, when the movement amount of a movable body is estimated using an image captured by an image capturing unit mounted in the movable body, it may be possible to adequately estimate the movement amount of the movable body. In addition, according to the third embodiment, from among edges removed as the shadow portion of a movable body, an edge that is estimated to be a portion other than the shadow of the movable body is supplemented, thereby making it possible to improve the estimation accuracy of a movement amount.

The movement amount of a movable body obtained in each of the above-mentioned embodiments may be applied to the following techniques:

analysis of vehicle behavior and application to driving assistance or driving risk analysis, and measurement of a surrounding object position due to moving stereo utilizing a movement amount and video picture characteristic point tracking.

In addition, in a recording medium, a program is recorded that is used to realize image processing that includes the movement amount estimation processing described in each of the above-mentioned embodiments, and hence, it may be possible to cause a computer to implement the processing described in each of the embodiments.

For example, by recording the program in a recording medium and causing the computer or the like to read the recording medium in which the program is recorded, it may also be possible to realize the above-mentioned processing.

In addition, as the recording medium, various types of recording media may be used that include a recording medium that optically, electrically, or magnetically records information, such as a CD-ROM, a flexible disk, or a magnet-optical disk, and a semiconductor memory that electrically records information, such as a ROM or a flash memory. In addition, the recording medium does not include a transient medium such as a carrier wave.

While the image processing device and the program have been described so far, the disclosed technology is not limited to a specific embodiment, and various modifications and alterations may occur insofar as they are within the scope of the appended claims. In addition, all or multiple elements of the configuration elements of the above-mentioned individual embodiments may also be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device, comprising:
a memory; and
a processor coupled to the memory, configured to:
extract an edge where positions overlap with each other, by comparing a first edge image extracted from an image captured for a first time and a second edge image extracted from an image captured for a second time after the first time, the image for the first time and the image for the second time being captured from a movable body,
remove the extracted edge from at least one of the first edge image and the second edge image,
perform matching processing on the first edge image and the second edge image in both or one of which the extracted edge has been removed,
obtain a displacement amount between the first edge image and the second edge image which are subjected to the matching processing by using the first edge image extracted from the projected image generated from the image captured for the first time, and the second edge image extracted from the projected image generated from the image captured for the second time,
estimate a movement amount of the movable body, by using the displacement amount between the first edge image and the second edge image which are subjected to the matching processing, and
generate a projected image displaying an image onto which a lower surface side that includes the movable body is projected from above, from an image captured from the movable body.

2. The image processing device according to claim 1, wherein
the processor is configured to:
generate a weighted image that includes weight coefficients different in a first edge group and a second edge group, the first edge group including the extracted edge from among one or more edges of the first edge image, and the second edge group including an edge other than the first edge group from among the one or more edges of the first edge image,
obtain a degree of coincidence between the first edge image and the second edge image based on the weighted image, and
perform the matching processing using the degree of coincidence.

3. The image processing device according to claim 2, wherein
the processor is configured to:
generate a third edge image that includes an edge for which a correspondence has been established in the matching processing on the first edge image and the second edge image, and
generate the weighted image that includes a first weight coefficient, a second weight coefficient and a third weight coefficient, by setting a relationship between the first weight coefficient, the second weight coefficient and the third weight coefficient to be the second weight coefficient greater than the third weight coefficient greater than the first weight coefficient, the second weight coefficient being for the second edge group, the third weight coefficient being for an edge other than the second edge group from among one or more edges of the third edge image, and the first weight coefficient being for an edge other than the second edge group and the one or more edges of the third edge image from among the first edge group.

4. The image processing device according to claim 3, wherein
the processor is configured to supplement an edge included in the third edge image with respect to an edge of the second edge group.

5. An image processing method, comprising:
extracting an edge where positions overlap with each other, by comparing a first edge image extracted from an image captured for a first time and a second edge image extracted from an image captured for a second time after the first time, the image for the first time and the image for the second time being captured from a movable body;
removing the extracted edge from at least one of the first edge image and the second edge image;

performing matching processing on the first edge image and the second edge image in both or one of which the extracted edge has been removed;

obtaining a displacement amount between the first edge image and the second edge image which are subjected to the matching processing by using the first edge image extracted from the projected image generated from the image captured for the first time, and the second edge image extracted from the projected image generated from the image captured for the second time;

estimating, with a processor, a movement amount of the movable body, by using a displacement amount between the first edge image and the second edge image which are subjected to the matching processing; and generating a projected image displaying an image onto which a lower surface side that includes the movable body is projected from above, from an image captured from the movable body.

6. The image processing method according to claim 5, further comprising:

generating a weighted image that includes weight coefficients different in a first edge group and a second edge group, the first edge group including the extracted edge from among one or more edges of the first edge image, and the second edge group including an edge other than the first edge group from among the one or more edges of the first edge image; and obtaining a degree of coincidence between the first edge image and the second edge image based on the weighted image, and wherein the performing includes performing the matching processing using the degree of coincidence.

7. The image processing method according to claim 6, further comprising:

generating a third edge image that includes an edge for which a correspondence has been established in the matching processing on the first edge image and the second edge image, and wherein the generating includes generating the weighted image that includes a first weight coefficient, a second weight coefficient and a third weight coefficient, by setting a relationship between the first weight coefficient, the second weight coefficient and the third weight coefficient to be the second weight coefficient greater than the third weight coefficient greater than the first weight coefficient, the second weight coefficient being for the second edge group, the third weight coefficient being for an edge other than the second edge group from among one or more edges of the third edge image, and the first weight coefficient being for an edge other than the second edge group and the one or more edges of the third edge image from among the first edge group.

8. The image processing method according to claim 7, further comprising:

supplementing an edge included in the third edge image with respect to an edge of the second edge group.

9. A movable body, comprising:

an image capturing device configured to capture an image for a first time and an image for a second time after the first time; and a processor coupled to the image capturing device, configured to:

extract an edge where positions overlap with each other, by comparing a first edge image extracted from the image for the first time and a second edge image extracted from the image for the second time, remove the extracted edge from at least one of the first edge image and the second edge image, perform matching processing on the first edge image and the second edge image in both or one of which the extracted edge has been removed, obtain a displacement amount between the first edge image and the second edge image which are subjected to the matching processing by using the first edge image extracted from the projected image generated from the image captured for the first time, and the second edge image extracted from the projected image generated from the image captured for the second time, estimate a movement amount of the movable body, by using a displacement amount between the first edge image and the second edge image which are subjected to the matching processing, and generate a projected image displaying an image onto which a lower surface side that includes the movable body is projected from above, from an image captured from the movable body.

10. The movable body according to claim 9, wherein the processor is configured to:

generate a weighted image that includes weight coefficients different in a first edge group and a second edge group, the first edge group including the extracted edge from among one or more edges of the first edge image, and the second edge group including an edge other than the first edge group from among the one or more edges of the first edge image, obtain a degree of coincidence between the first edge image and the second edge image based on the weighted image, and perform the matching processing using the degree of coincidence.

11. The movable body according to claim 10, wherein the processor is configured to:

generate a third edge image that includes an edge for which a correspondence has been established in the matching processing on the first edge image and the second edge image, and generate the weighted image that includes a first weight coefficient, a second weight coefficient and a third weight coefficient, by setting a relationship between the first weight coefficient, the second weight coefficient and the third weight coefficient to be the second weight coefficient greater than the third weight coefficient greater than the first weight coefficient, the second weight coefficient being for the second edge group, the third weight coefficient being for an edge other than the second edge group from among one or more edges of the third edge image, and the first weight coefficient being for an edge other than the second edge group and the one or more edges of the third edge image from among the first edge group.

12. The movable body according to claim 11, wherein the processor is configured to supplement an edge included in the third edge image with respect to an edge of the second edge group.

* * * * *